United States Patent
Enjoji et al.

(10) Patent No.: US 7,422,814 B2
(45) Date of Patent: Sep. 9, 2008

(54) FUEL CELL SYSTEM

(75) Inventors: Naoyuki Enjoji, Utsunomiya (JP);
Hidehiko Takase, Utsunomiya (JP);
Keisuke Andou, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 573 days.

(21) Appl. No.: 10/768,438

(22) Filed: Jan. 29, 2004

(65) Prior Publication Data
US 2004/0185319 A1   Sep. 23, 2004

(30) Foreign Application Priority Data
Jan. 29, 2003   (JP) ............... 2003-020959
Jan. 29, 2003   (JP) ............... 2003-020969

(51) Int. Cl.
*H01M 8/04* (2006.01)
*H01M 8/24* (2006.01)

(52) U.S. Cl. ............... 429/32; 429/26; 429/38; 429/39; 429/44

(58) Field of Classification Search ............... None
See application file for complete search history.

(56) References Cited

U.S. PATENT DOCUMENTS

| | | | |
|---|---|---|---|
| 6,423,203 B1 | 7/2002 | Faita et al. | |
| 6,497,974 B2 * | 12/2002 | Fuglevand | 429/22 |
| 6,689,502 B2 * | 2/2004 | Choi | 429/32 |
| 7,038,424 B2 * | 5/2006 | Adams et al. | 320/101 |
| 7,081,317 B2 * | 7/2006 | Fujii et al. | 429/40 |
| 2002/0076597 A1 | 6/2002 | Chang et al. | |

FOREIGN PATENT DOCUMENTS

| | | |
|---|---|---|
| JP | 62-24570 | 2/1987 |
| JP | 2-78159 | 3/1990 |
| JP | 4-206162 | 7/1992 |
| JP | 9-199151 | 7/1997 |
| JP | 2001-283892 A1 | 10/2001 |
| JP | 2002-056855 | 2/2002 |
| JP | 2002-513199 A2 | 5/2002 |
| WO | WO-01/73879 A1 | 10/2001 |
| WO | WO-02/07242 A2 | 1/2002 |
| WO | WO 02/080299 | * 12/2002 |

OTHER PUBLICATIONS

Japanese Office Action for Application No. 2003-020959, dated Apr. 8, 2008.

* cited by examiner

*Primary Examiner*—Jonathan Crepeau
(74) *Attorney, Agent, or Firm*—Lahive & Cockfield, LLP; Anthony A. Laurentano, Esq.

(57) ABSTRACT

A fuel cell unit includes a plurality of fuel cells. Each of the fuel cells includes a plurality of power generation units. The power generation units are electrically connected in series for outputting a desired level of voltage. The fuel cells are stacked in a direction indicated by an arrow A for combining electrical currents outputted from the respective fuel cells, and the combined electric current is supplied to a power generation circuit. The power generation circuit is selectively connected to the fuel cells by switches.

10 Claims, 18 Drawing Sheets the electrolyte layers 1a through 1d. Conductive Z-like connection plates 5a through 5d connect the unit cells 4a through 4d together in series.

Specifically, the conductive Z-like connection plate 5a connects the cathode 2a of the unit cell 4a and the anode 3b of the unit cell 4b, the conductive Z-like connection plate 5b connects the cathode 2b of the unit cell 4b and the anode 3c of the unit cell 4c, and the conductive Z-like connection plate 5c connects the cathode 2c of the unit cell 4c and the anode 3d of the unit cell 4d. The anode 3a of the unit cell 4a is connected to a terminal 6a, and the cathode 2d of the unit cell 3d is connected to a terminal 6b.

Thus, the desired level of voltage can be generated by one flat fuel cell, and a plurality of the flat fuel cells may be stacked together to output an electrical current having a current value depending on the number of the flat fuel cells.

However, since a plurality of the flat fuel cells are electrically connected together, a large potential difference may occur undesirably between the fuel cells in the event of a failure in any of the fuel cells. Consequently, a reverse voltage may be applied to the flat fuel cell of the low voltage level, and the flat fuel cell would be damaged.

According to the disclosed prior art technique, the dedicated Z-like connection plates 5a through 5c are required for connecting the unit cells 4a through 4d electrically in series. A large number of Z-like connection plates are required when many unit cells are used in the fuel cell. The number of components of the fuel cell is large. Further, it is difficult to maintain the reliability of the seal structure or the like. Moreover, the thickness of the fuel cell in the direction indicated by an arrow T is large. Thus, the overall size of the fuel cell is not small.

FUEL CELL SYSTEM

BACKGROUND OF THE INVENTION

1. Field of the Invention

The present invention relates to a fuel cell system which includes a fuel cell having a plurality of power generation units arranged in a same plane, and electrically connected in series. Each of the power generation units includes an anode, a cathode, and an electrolyte interposed between the anode and the cathode.

2. Description of the Related Art

Typically, a solid polymer electrolyte fuel cell employs a membrane electrode assembly (MEA) which includes two electrodes (anode and cathode), and an electrolyte membrane interposed between the electrodes. Each of the electrodes comprises an electrode catalyst layer of noble metal supported on a carbon base material. The electrolyte membrane is a polymer ion exchange membrane. The membrane electrode assembly is a power generation unit interposed between separators (bipolar plates). The membrane electrode assembly and the separators make up a unit of a fuel cell (unit cell) for generating electricity. A predetermined number of the fuel cells are stacked together to form a fuel cell stack.

In the fuel cell, a fuel gas (reactant gas) such as a gas chiefly containing hydrogen (hydrogen-containing gas) is supplied to the anode. The catalyst of the anode induces a chemical reaction of the fuel gas to split the hydrogen molecule into hydrogen ions (protons) and electrons. The hydrogen ions move toward the cathode through the electrolyte, and the electrons flow through an external circuit to the cathode, creating a DC electric current. A gas chiefly containing oxygen (oxygen-containing gas) or air is supplied to the cathode. At the cathode, the hydrogen ions from the anode combine with the electrons and oxygen to produce water.

If the fuel cell stack is mounted on a vehicle, hundreds of unit cells are electrically connected together in series for generating the desired level of voltage. In the event of a failure or a malfunction of any of the unit cells, the power generation performance of the entire fuel cell stack may be affected undesirably. In order to prevent the problem, typically, purging operation is performed by supplying the fuel gas to the anode while the power generation is stopped, or performed at a low level.

However, it is not efficient to stop the power generation of all the unit cells when one of the unit cells has a failure or the like. In particular, in the automobile application, hundreds of unit cells are used to form the fuel cell stack. Therefore, every unit cell needs to have high reliability, and a dedicated diluter for diluting the fuel gas used in the purging operation is required. Such equipment would raise the cost of the fuel cell system.

In an attempt to address the problem, for example, Japanese Laid-Open Patent Publication No. 2002-56855 discloses a flat fuel cell in which a plurality of unit cells are arranged in the same plane in a single row, or a plurality of rows, and are electrically connected in series.

FIG. 18 shows the flat fuel cell. The flat fuel cell includes unit cells 4a through 4d. Air electrodes (cathodes) 2a through 2d and fuel electrodes (anodes) 3a through 3d are provided on both sides of electrolyte layers 1a through 1d. The same electrodes are arranged on the same side of the electrolyte layers 1a through 1d, i.e., the cathodes 2a through 2d are arranged on one side of the electrolyte layers 1a through 1d, and the anodes 3a through 3d are arranged on the other side of

SUMMARY OF THE INVENTION

A general object of the present invention is to provide a fuel cell unit having a simple structure and a method of simply operating the fuel cell unit, in which it is possible to continue the desired power generation even if any of fuel cells has a failure so that the power generation can be carried out efficiently.

A main object of the present invention is to provide a simple and compact fuel cell in which a plurality of power generation units are electrically connected in series so that the desired level of voltage can be generated.

According to the present invention, a fuel cell unit includes a plurality of fuel cells and a power generation circuit, and a switching mechanism. Each of the fuel cells comprises a plurality of power generation units arranged on a same plane, and electrically connected in series. Each of the power generation units includes an anode, a cathode, and an electrolyte interposed between the anode and the cathode. The power generation circuit connects the fuel cells to a load in parallel. The switching mechanism selectively connects the fuel cells to and disconnects the fuel cells from the power generation circuit.

The power generation is carried out by connecting the fuel cells to the load in parallel, and the power generation condition is detected in each of the fuel cells. If any of the fuel cells is in an abnormal power generation condition, the abnormal fuel cell is disconnected from the load, and the power generation is continued by the remaining fuel cells.

The desired level of voltage can be obtained in each of the fuel cells. Thus, even if one or more fuel cell is in an abnormal power generation condition, the desired level of voltage can be maintained by the remaining fuel cells. The abnormal fuel cell is disconnected from the power generation circuit. Therefore, the reverse voltage is not applied to the abnormal fuel cell, and it is possible to continue the power generation by the remaining fuel cells. The power generation can be carried out efficiently.

Variable resistors are connected to the respective fuel cells. The variable resistors are operated for regulating the voltage in each of the fuel cells. Thus, the fuel cell unit can carry out power generation efficiently without any voltage difference among the fuel cells.

Further, the fuel cell may include a first output terminal and at least two second output terminals. Different numbers of power generation units can be connected between the first output terminal and the second output terminals. Further, the switching mechanism may selectively connect one of the second output terminals to the first output terminal. Therefore, the level of the voltage outputted from the power generation units can be changed flexibly depending to the power generation condition. The voltage differences among the fuel cells are suitably regulated, and the efficient power generation can be carried out.

A plurality of fuel cell units are connected in parallel to a load for starting power generation. The power generation condition of the fuel cell units is detected in each of the fuel cells, and if any of the fuel cell units is in an abnormal power generation condition, the abnormal fuel cell unit is disconnected from the load, and the power generation can be continued by the remaining fuel cell units.

Thus, even if one or more fuel cell unit is in an abnormal power generation condition, the desired level of voltage can be maintained by the remaining fuel cell units. The abnormal fuel cell unit is disconnected from the power generation circuit. Therefore, the reverse voltage is not applied to the abnormal fuel cell unit, and it is possible to continue the power generation by the remaining fuel cell units. The power generation can be carried out efficiently.

A fuel gas supplying mechanism may be provided for supplying a fuel gas to the fuel cell units, an oxygen-containing gas supplying mechanism may be provided for supplying an oxygen-containing gas to the fuel cell units. The fuel gas supplying mechanism may include a valve for each of the fuel cell units to stop the supply of the fuel gas, and the oxygen-containing gas supplying mechanism may include a valve for each of the fuel cell units to stop the supply of the oxygen-containing gas.

Thus, the power generation condition is regulated in each of the fuel cell units. For example, the power generation of at least one of the fuel cells is stopped when a small amount of electrical energy is supplied to the load.

Further, power generation of different fuel cell units may be stopped one by one successively at predetermined time intervals. Thus, the power generation units of the fuel cell units are not dried excessively, or cooled excessively. Since the fuel cell units stop power generation periodically, these fuel cell units are purged effectively.

When any of the fuel cell units is not operated for power generation, the amount of coolant supplied to the fuel cell unit which is not operating for power generation is smaller than the amount of coolant supplied to the fuel cell units which are operating for power generation. Thus, when the fuel cell unit is stopped, the temperature of the fuel cell unit does not decrease excessively, and the temperature is maintained at a desired level.

First and second pumps are connected in parallel to each of the fuel gas supplying mechanism and the oxygen-containing gas supplying mechanism. The first pumps supply predetermined amounts of the fuel gas and the oxygen-containing gas corresponding to a predetermined electrical energy supplied to the load and the second pumps supply small amounts of the oxygen-containing gas and the fuel gas corresponding to a small amount of electrical energy supplied to the load. Thus, when the power generation is performed at a low level mode for supplying small electrical energy to the load, a desired number of fuel cell units are selected for performing the optimized power generation. With the use of the second pumps for the low level mode, the efficient power generation is carried out reliably.

The coolant supplying mechanism is connected in parallel to a first pump and a second pump, and the first pump supplies a predetermined amount of the coolant corresponding to a predetermined electrical energy supplied to the load and the second pump supplies a small amount of the coolant corresponding to a small amount of electrical energy supplied to the load. Thus, the amount of coolant is regulated suitably corresponding to the level of the load. These coolant pumps are utilized efficiently.

According to the present invention, a pair of metal diffusion layers are provided on both surfaces of the power generation units. A resin insulator is provided in the metal diffusion layer, between predetermined power generation units. The adjacent power generation units are connected with each other. The metal diffusion layer of one of the adjacent power generation units is connected to the metal diffusion layer of the other of the adjacent power generation units. Pairs of the adjacent power generation units are connected for connecting all the power generation units in series with each other.

Specifically, the anode of the first power generation unit is connected to the cathode of the adjacent second power generation unit by the first metal diffusion layer, and the anode of the second power generation unit is connected to the cathode of the adjacent third power generation unit by the second metal-diffusion layer. Further, the anode of the third power generation unit is connected to the cathode of the adjacent fourth power generation unit by the first metal diffusion layer.

The metal diffusion layers function to connect the electrodes. Therefore, conventional Z-like connection plates are not required. The number of components of the fuel cell is small. In particular, when a large number of power generation units are provided in the fuel cell, the fuel cell has a reliable sealing structure, and the fuel cell is economical. The overall fuel cell system is simple and small.

According to the present invention, a pair of electrically insulating separators are provided for sandwiching the metal diffusion layers and the power generation units interposed between the metal diffusion layers. At least one of the electrically insulating separators includes a fuel gas flow field and an oxygen-containing gas flow field alternately on one surface facing the power generation units. A coolant flow field is provided on the surface opposite to the surface facing the power generation units.

Thus, the coolant flow field is electrically insulated effectively. Leakages of the electricity through the liquid or to the earth are reliably prevented. Consequently, special coolant for the fuel cell or dedicated devices for preventing the leakages of the electricity through the liquid such as an ion exchanger are not required. The cooling system is simple, and produced or operated at a low cost. The periodical maintenance operations are not required.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
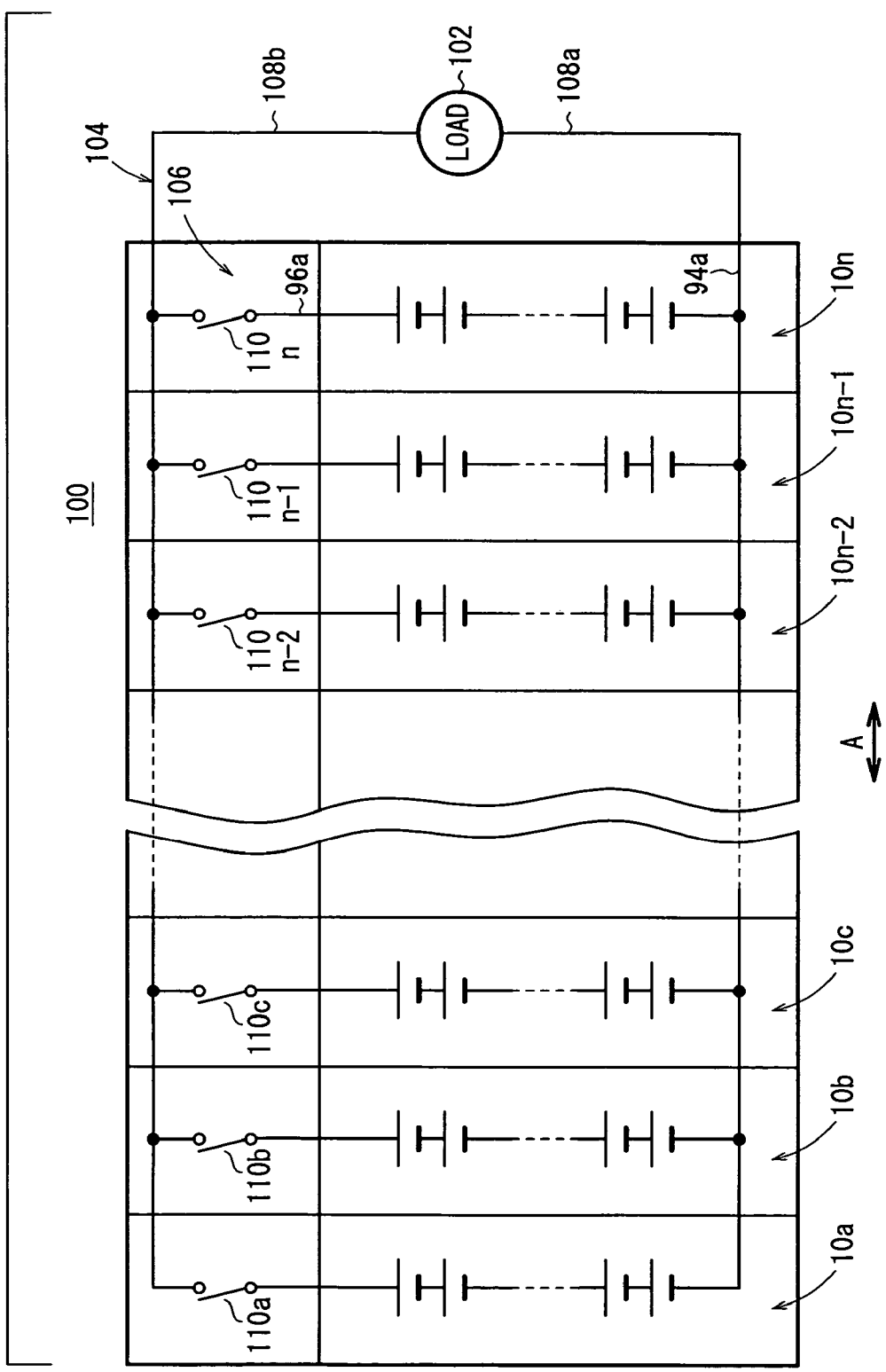
FIG. 1 is a diagram schematically showing a fuel cell unit according to a first embodiment of the present invention.

FIG. 1 is a diagram schematically showing a fuel cell unit 100 according to a first embodiment of the present invention.

The fuel cell unit 100 includes a plurality of fuel cells 10a through 10n stacked in a direction indicated by an arrow A, and a power generation circuit 104 for connecting the fuel cells 10a through 10n to a load 102 such as a motor. Further, the fuel cell unit 100 includes a switching mechanism 106 for selectively connecting the fuel cells 10a through 10n to the power generation circuit 104, and disconnecting the fuel cells 10a through 10n from the power generation circuit 104.

Figure 2:
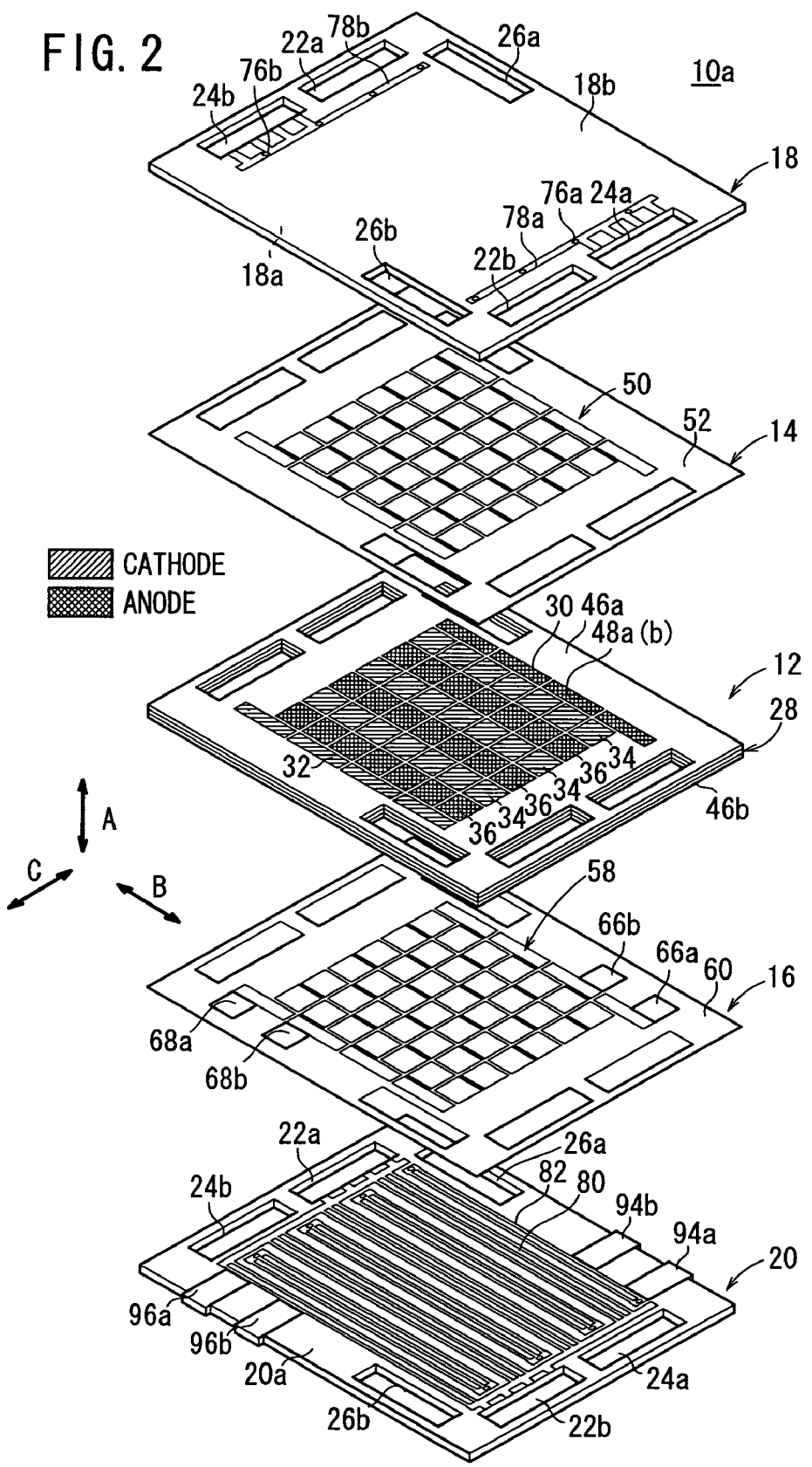
FIG. 2 is an exploded perspective view showing main components of a fuel cell of the fuel cell unit.
Figure 3:
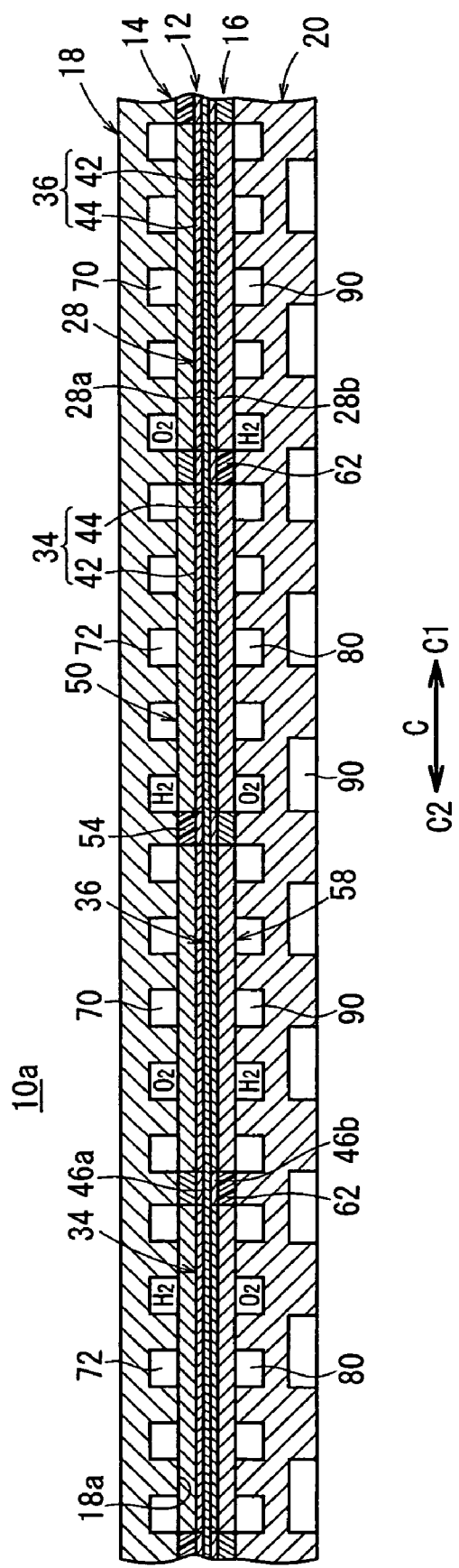
FIG. 3 is a cross sectional view showing main components of the fuel cell.

Since the fuel cells 10a through 10n have the same structure, one of the fuel cells 10a through 10n, i.e., the fuel cell 10a will be described in detail below, and description of the other fuel cells 10b through 10n will be omitted. As shown in FIGS. 2 and 3, the fuel cell 10a includes a MEA (membrane electrode assembly) unit 12, and first and second diffusion layers 14, 16 provided on both surfaces of the MEA unit 12, and first and second electrically insulating separators 18, 20 stacked on the outside of the first and second diffusion layers 14, 16, respectively.

At one end of the fuel cell 10a in a direction indicated by an arrow B, an oxygen-containing gas supply passage 22a for supplying an oxygen-containing gas and a fuel gas discharge passage 24b for discharging a fuel gas such as a hydrogen-containing gas are arranged in a direction indicated by an arrow C. The oxygen-containing gas supply passage 22a and the fuel gas discharge passage 24b extend through the fuel cell 10a in the direction indicated by the arrow A. At the other end of the fuel cell 10a in the direction indicated by the arrow B, a fuel gas supply passage 24a for supplying the fuel gas and an oxygen-containing gas discharge passage 22b for discharging the oxygen-containing gas are arranged in the direction indicated by the arrow C. The fuel gas supply passage 24a and the oxygen-containing gas discharge passage 22b extend through the fuel cell 10a in the direction indicated by the arrow A.

At one end of the fuel cell 10a in a direction indicated by an arrow C, a coolant supply passage 26a for supplying a coolant is provided. At the other end of the fuel cell 10a in a direction indicated by an arrow C, a coolant discharge passage 26b for discharging the coolant is provided. The coolant supply passage 26a and the coolant discharge passage 26b extend through the fuel cell 10a in the direction indicated by the arrow A.

The MEA unit 12 includes a solid polymer electrolyte membrane 28 formed by impregnating a thin membrane of perfluorosulfonic acid with water, for example. The solid polymer electrolyte membrane 28 is a common electrolyte for making up first membrane electrode assemblies (power generation units) 30, second membrane electrode assemblies (power generation units) 32, third membrane electrode assemblies (power generation units) 34, and fourth membrane electrode assemblies (power generation units) 36.

Figure 4:
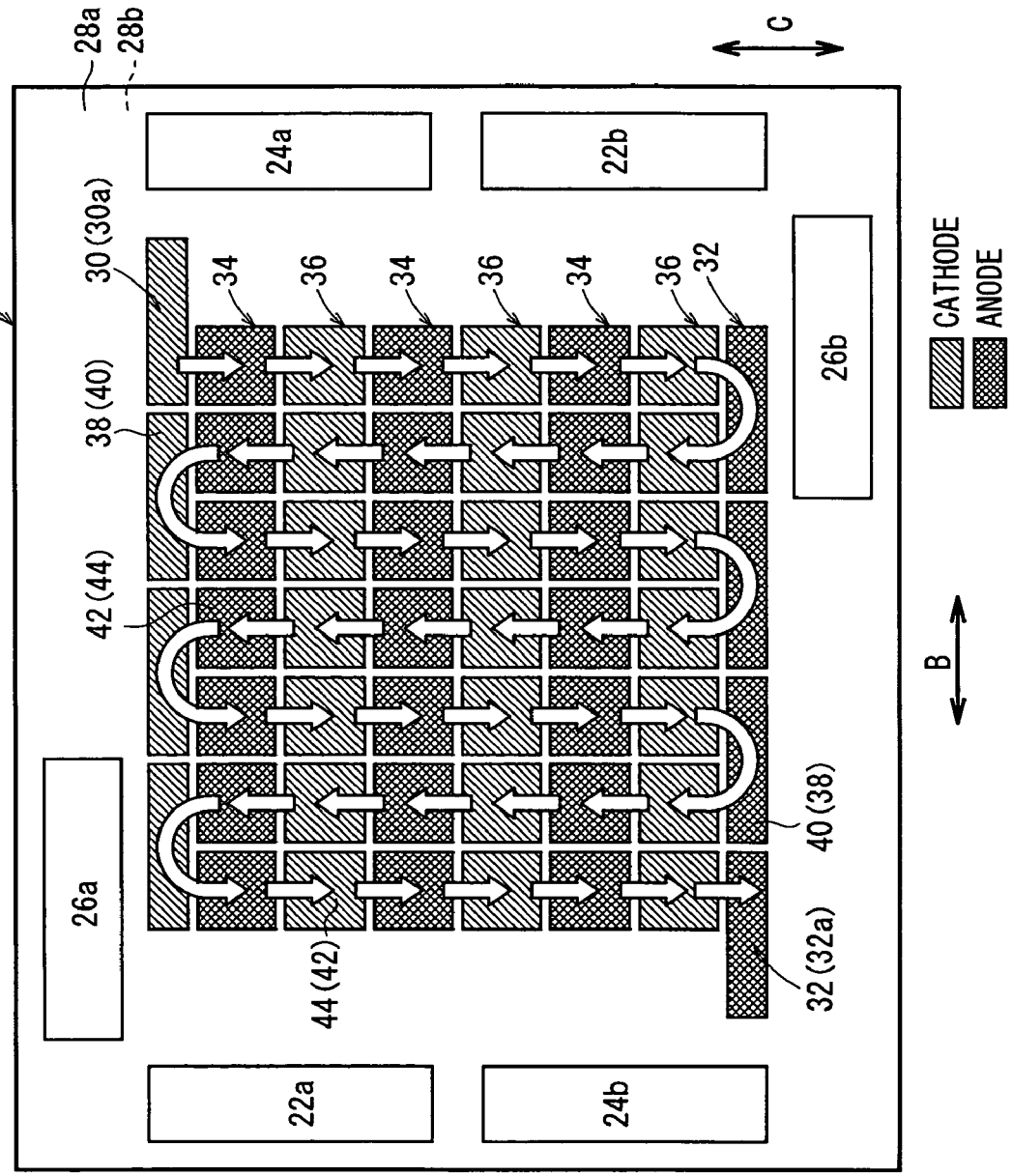
FIG. 4 is a view showing connection of MEA units of the fuel cell.

The first membrane electrode assemblies 30 are provided at one end of the solid polymer electrolyte membrane 28 in the direction indicated by the arrow C. The first membrane electrode assemblies 30 are arranged in the direction indicated by the arrow B, and the number of the first membrane electrode assemblies 30 is four, for example. As shown in FIG. 4, each of the first membrane electrode assemblies 30 includes a rectangular cathode 38 provided on one surface 28a of the slid polymer electrolyte membrane 28, and a rectangular anode 40 provided on the other surface 28b of the solid polymer electrolyte membrane 28. Each of the anode 40 and the cathode 30 has a gas diffusion layer such as a carbon paper, and an electrode catalyst layer of platinum alloy supported on carbon particles. The carbon particles are deposited uniformly on the surface of the gas diffusion layer. The electrode catalyst layer of the anode 40 and the electrode catalyst layer of the cathode 38 are fixed to both surfaces 28a, 28b of the solid polymer electrolyte membrane 28, respectively.

The second membrane electrode assemblies 32 are provided at the other end of the solid polymer electrolyte membrane 28 in the direction indicated by the arrow C. The second membrane electrode assemblies 32 are arranged in the direction indicated by the arrow B, and the number of the second membrane electrode assemblies 32 is four, for example. Each of the second membrane electrode assemblies 32 includes an anode 40 provided on the surface 28a of the slid polymer electrolyte membrane 28, and a cathode 38 provided on the other surface 28b of the solid polymer electrolyte membrane 28. The first membrane electrode assemblies 30 and the second membrane electrode assemblies 32 are symmetrical about a point.

Next to the first membrane electrode assemblies 30, for example, seven third membrane electrode assemblies 34 are arranged in the direction indicated by the arrow B. Each of the third membrane electrode assemblies 34 includes a square anode 42 and a square cathode 44. The side of the anode 42 and the cathode 44 is about the half of the long side of the anode 40 and the cathode 38. The anode 42 is provided on the surface 28a, and the cathode 44 is provided on the surface 28b.

The third membrane electrode assemblies 34 are arranged in seven columns in the direction indicated by the arrow B, and in three rows in the direction indicated by the arrow C at predetermined intervals. The fourth membrane electrode assemblies 36 are provided between the third membrane electrode assemblies 34, and between and the second membrane electrode assemblies 32 and the third membrane electrode assemblies 34.

The fourth membrane electrode assemblies 36 have the same structure as the third membrane electrode assemblies 34. The fourth membrane electrode assemblies 36 are arranged in seven columns in the direction directed by the arrow B, in three rows in the direction indicated by the arrow C at predetermined intervals. Each of the fourth membrane electrode assemblies 36 includes a cathode 44 provided on the surface 28a, and an anode 42 provided on the surface 28b.

As shown in FIG. 2, silicon films 46a, 46b are stacked on both surfaces 28a, 28b of the solid polymer electrolyte membrane 28. The silicon films 46a, 46b have cutouts 48a, 48b corresponding to the shapes of the first through fourth membrane electrode assemblies 30 through 36.

Figure 5:
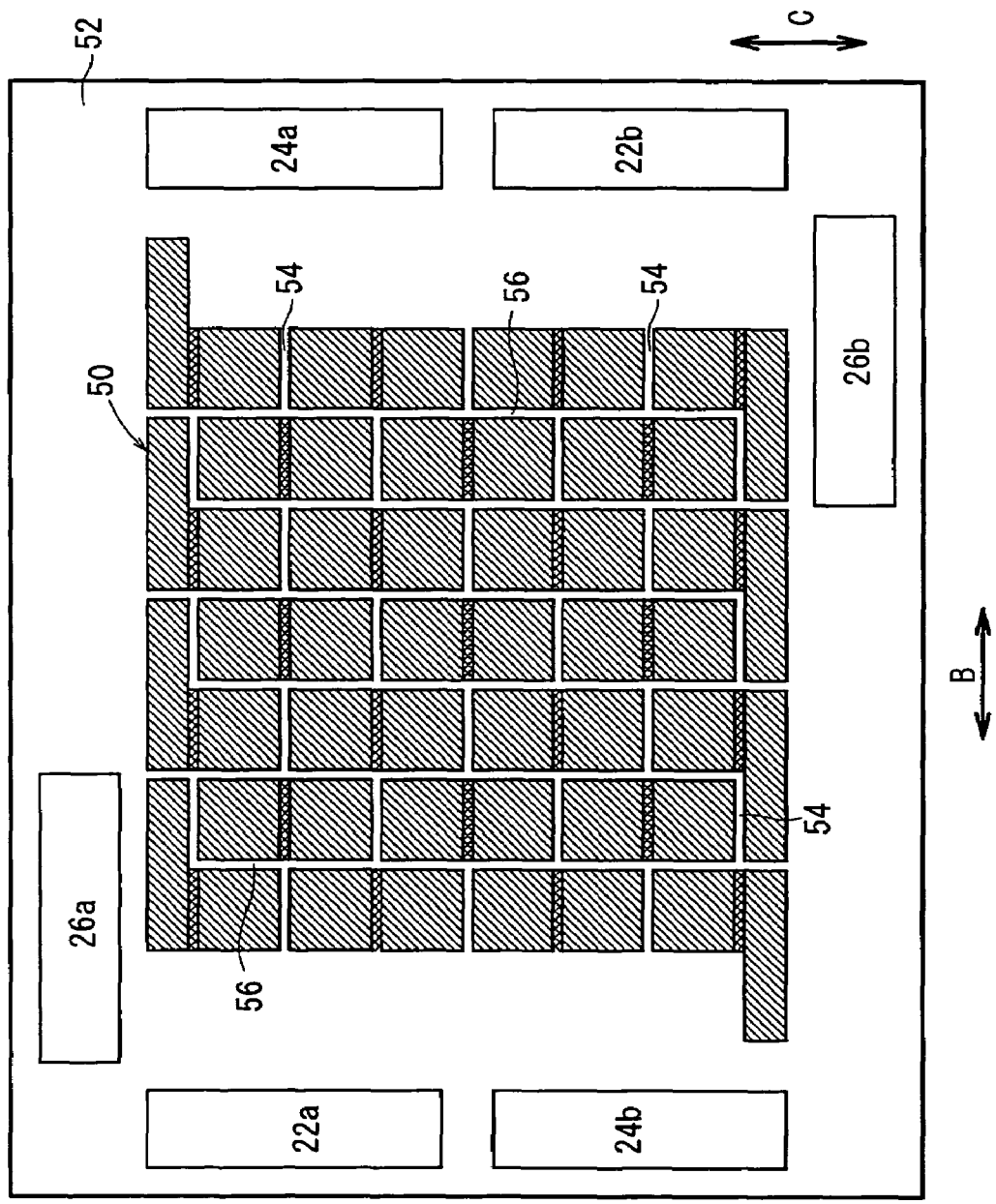
FIG. 5 is a front view showing a first diffusion layer of the fuel cell.

In FIG. 5, the first diffusion layer 14 includes a foamed metal diffusion layer 50 having a good electrical conductivity. The foamed metal diffusion layer 50 is resistant to corrosion by water, and made of non-corrosive metal material in the presence of a strong acid. For example, stainless steel, titanium, or nickel are used as the metal material. Further, the first diffusion layer 14 includes a resin layer 52 made of thermoplastic resin or thermosetting resin.

The metal diffusion layer 50 has a shape corresponding to the shapes of the first through fourth membrane electrode assemblies 30 through 36. Resin insulators 54 are provided in the metal diffusion layer 50. The resin insulators 54 extend discontinuously in the direction indicated by the arrow B, between the first and third membrane electrode assemblies 30, 34, and between the third and fourth membrane electrode assemblies 34, 36, and between the fourth and second membrane electrode assemblies 36, 32.

The resin insulators 54 insulate power generation units (first through fourth membrane electrode assemblies 30 through 36) from each other. For example, a pair of anodes 42 of the third membrane electrode assemblies 34 are provided adjacent to one cathode 38 of the first membrane electrode assembly 30 in the direction indicated by the arrow C. One of the anodes 42 of the third membrane electrode assemblies 34 is electrically connected to the cathode 38 of the first membrane electrode assembly 30, and the other of the anodes 42 of the third membrane electrode assemblies 34 is electrically insulated from the cathode 38 of the first membrane electrode assembly 30. Thus, the anodes 42 of the third membrane electrode assemblies 34 arranged in the direction indicated by the arrow B are electrically connected to, and electrically insulated from the adjacent cathodes 38 of the first membrane electrode assembly 30 alternately.

The anodes 42 of the third membrane electrode assemblies 34 and the cathodes 44 of the fourth membrane electrode assemblies 36 arranged in the adjacent rows in the direction indicated by the arrow C are electrically connected to, and electrically insulated from each other alternately in the direction indicated by the arrow B. Similarly, the cathodes 44 of the fourth membrane electrode assemblies 36 and the anodes 40 of the second membrane electrode assemblies 32 arranged in the adjacent rows in the direction indicated by the arrow C are electrically connected to, and electrically insulated from each other alternately in the direction indicated by the arrow B.

Resin insulators 56 extend from the first membrane electrode assemblies 30 to the second membrane electrode assemblies 32 in the direction indicated by the arrow C. The resin insulators 56 electrically insulate the first through fourth membrane electric assemblies 30 through 36.

Figure 6:
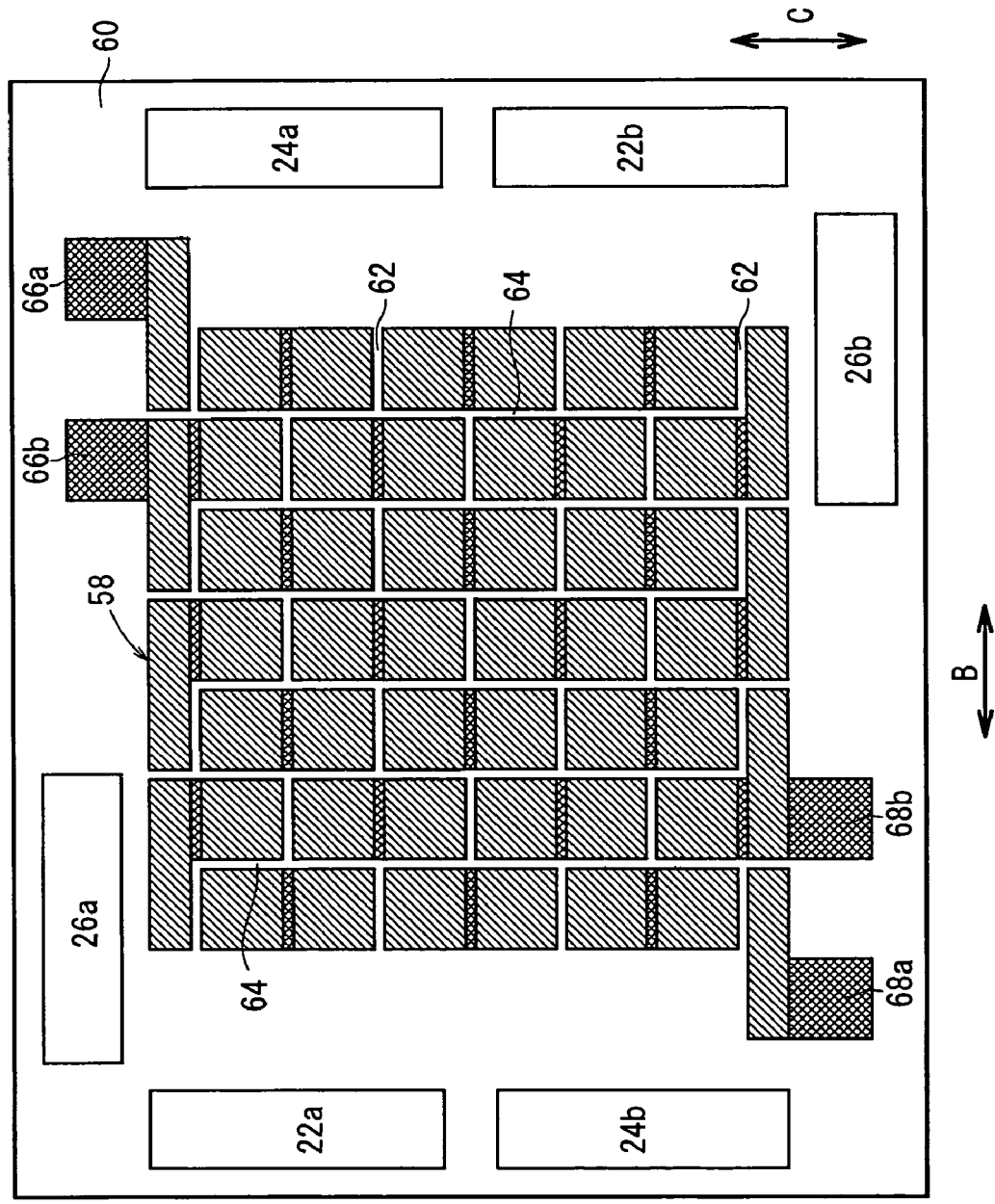
FIG. 6 is a front view showing a second diffusion layer of the fuel cell.

As shown in FIG. 6, the second diffusion layer 16 includes a metal diffusion layer 58 and a resin layer 60 as with the first diffusion layer 14. A plurality of resin insulators 62 extend in the metal diffusion layer 58 discontinuously in the direction indicated by the arrow B. The resin insulators 62 are arranged at predetermined intervals in the direction indicated by the arrow C. Further, a plurality of resin insulators 64 extend in the direction indicated by the arrow C. The resin insulators 64 are arranged at predetermined intervals in the direction indicated by the arrow B.

When the first and second diffusion layers 14, 16 are stacked together, the resin insulators 62 and the resin insulators 54 are provided alternately. Connection terminals 66a, 66b, and 68a, 68b are provided at diagonally opposite positions by impregnating the resin layer 60. The connection terminals 66a, 66b, 68a, 68b are provided such that metal portions are exposed.

As shown in FIG. 3, when the MEA unit 12 is interposed between the first and second diffusion layers 14, 16, the anodes 42 of the third membrane electrode assemblies 34 and the adjacent cathodes 44 of the fourth membrane electrode assembly 36 are electrically connected by the metal diffusion layer 50, and electrically insulated by the resin insulators 54 alternately. The cathodes 44 of the third membrane electrode assemblies 34 and the adjacent anodes 42 of the fourth membrane electrode assemblies 36 are electrically connected by the metal diffusion layer 50, and electrically insulated by the resin insulators 62 alternately.

In the metal diffusion layers 50, 58, the resin insulators 54, 62 are provided alternately such that the third and fourth membrane electrode assemblies 34, 36 arranged in the direction indicated by the arrow C are electrically connected in series between the first and second membrane electrode assemblies 30, 32. As shown in FIG. 4, the first and second membrane electrode assemblies 30, 32 have the length twice as long as the side (length) of the third and fourth membrane electrode assemblies 34, 36 in the direction indicated by the arrow B. In the MEA unit 12, the first through fourth membrane electrode assemblies 30 through 36 are electrically connected in series as shown by arrows in FIG. 4.

Figure 7:
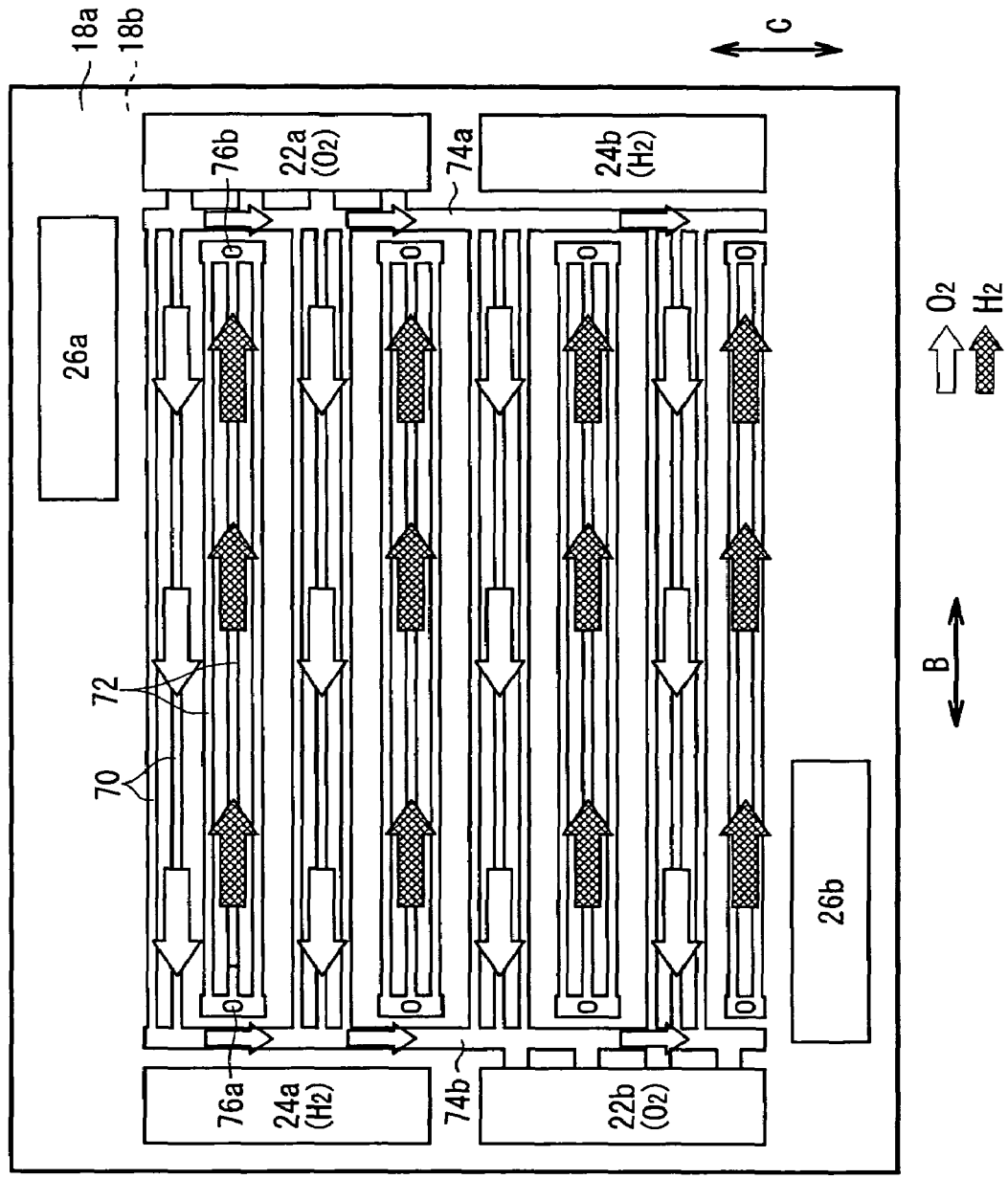
FIG. 7 is a front view showing one surface of a first separator of the fuel cell.

As shown in FIGS. 3 and 7, the first separator 18 has oxygen-containing gas flow fields 70 and fuel gas flow fields 72 alternately in the direction indicated by the arrow C on its surface 18a facing the MEA unit 12. The oxygen-containing gas flow fields 70 and the fuel gas flow fields 72 extend along the surface 18a in the direction indicated by the arrow B. The oxygen-containing gas flow fields 70 include a plurality of grooves for supplying the oxygen-containing gas to the cathodes 38, 44 of the first and fourth membrane electrode assemblies 30, 36. Connection grooves 74a, 74b are provided at opposite ends in the direction indicated by the arrow B. The connection grooves 74a, 74b extend in the direction indicated by the arrow C. The connection groove 74a is connected to the oxygen-containing gas supply passage 22a, and the connection groove 74b is connected to the oxygen-containing gas discharge passage 22b.

Likewise, the fuel gas flow fields 72 include a plurality of grooves for supplying the fuel gas to the anodes 40, 42 of the second and third membrane electrode assemblies 32, 34. Each of the fuel gas flow fields 72 is connected to through-holes 76a, 76b formed at opposite ends in the direction indicated by the arrow B. As shown in FIG. 2, the first separator 18 has a connection groove 78a extending in the direction indicated by the arrow C on its surface 18b. The connection groove 78a is connected to the through-holes 76a, and connected to the fuel gas supply passage 24a. Similarly, a long connection groove 78b extending in the direction indicated by the arrow C is formed on the surface 18b. The connection groove 78b is connected to the through-holes 76b, and connected to the fuel gas discharge passage 24b.

Figure 8:
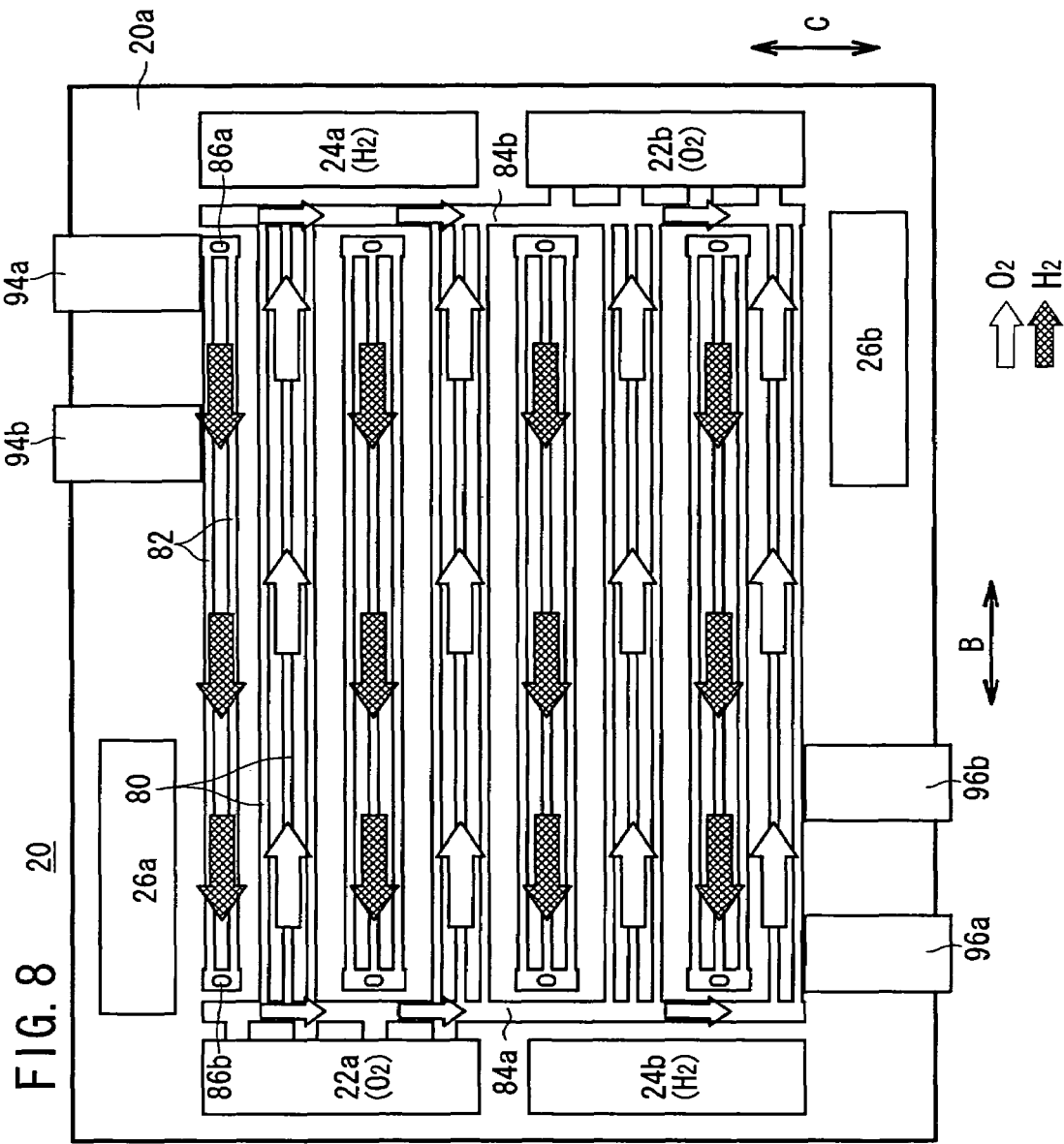
FIG. 8 is a front view showing one surface of a second separator of the fuel cell.

As shown in FIGS. 2, 3, and 8, the second separator 20 has oxygen-containing gas flow fields 80 extending in the direction indicated by the arrow B for supplying the oxygen-containing gas to the cathodes 38, 44 of the second and third membrane electrode assemblies 32, 34, and fuel gas flow fields 82 extending in the direction indicated by the arrow B for supplying the fuel gas to the anodes 40, 42 of the first and fourth membrane electrode assemblies 30, 36.

The oxygen-containing gas flow fields 80 include a plurality of grooves, and the grooves are connected to connection grooves 84a, 84b at opposite ends in the direction indicated by the arrow B. The connection grooves 84a, 84b extend in the direction indicated by the arrow C. The connection groove 84a is connected to the oxygen-containing gas supply passage 22a, and the connection groove 84b is connected to the oxygen-containing gas discharge passage 22b.

Figure 9:
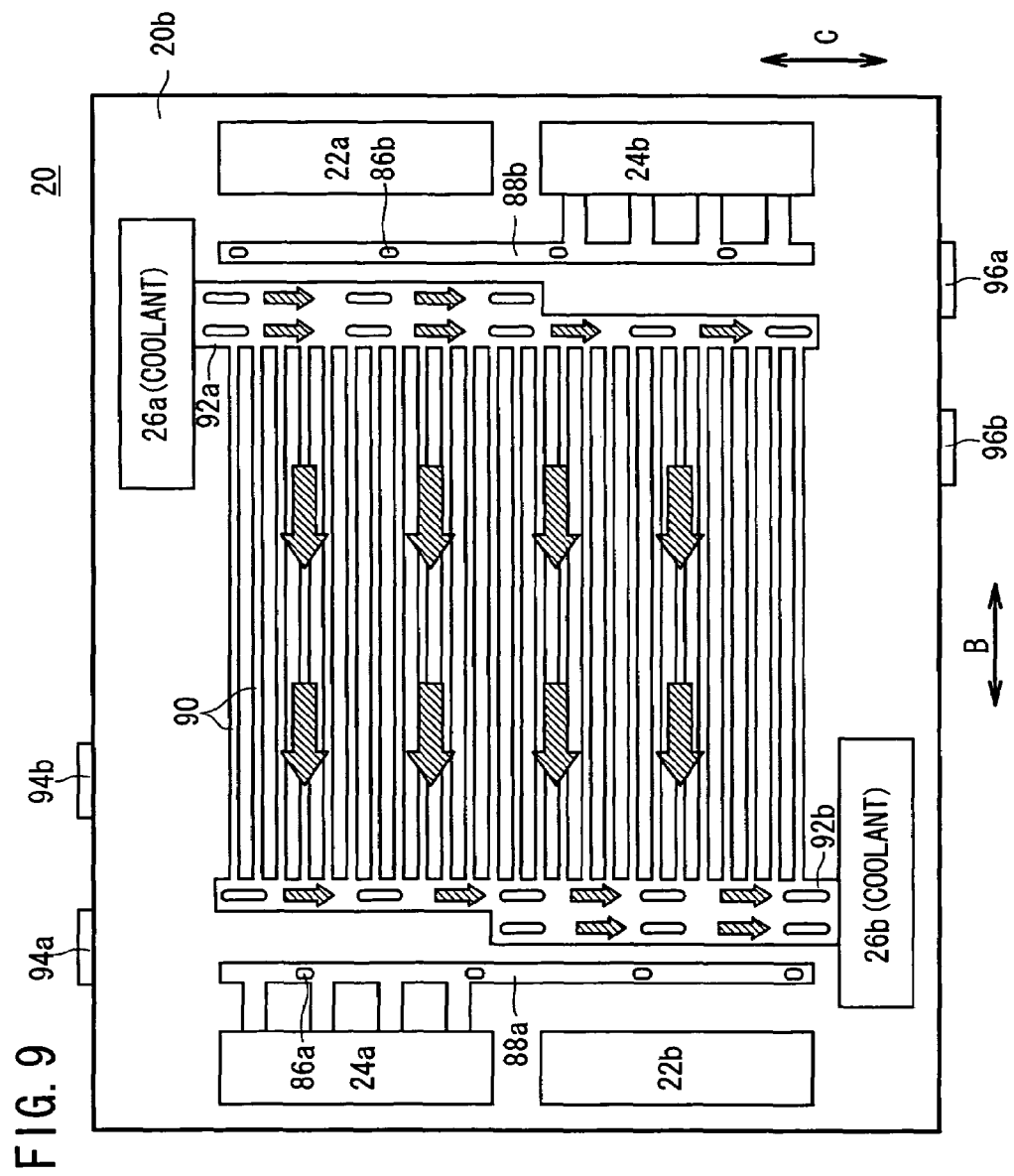
FIG. 9 is a front view showing the other surface of the second separator.

The fuel gas flow fields 82 include a plurality of grooves, and the grooves are connected to through-holes 86a, 86b at opposite ends in the direction indicated by the arrow B. As shown in FIG. 9, a connection groove 88a extending in the direction indicated by the arrow C is formed on the other surface 20b of the second separator 20. The connection groove 88a is connected to the through-holes 86a, and connected to the fuel gas supply passage 24a. Similarly, a connection groove 88b extending in the direction indicated by the arrow C is formed on the surface 20b. The connection groove 88b is connected to the through-holes 86b, and connected to the fuel gas discharge passage 24b.

A coolant flow field 90 is provided on the surface 20b. The coolant flow field 90 is connected between the coolant supply passage 26a and the coolant discharge passage 26b. The coolant flow field 90 includes a plurality of grooves extending in the direction indicated by the arrow B. At one end of the coolant flow field 90 in the direction indicted by the arrow B, the coolant flow field 90 is connected to the coolant supply passage 26a through a connection groove 92a extending in the direction indicated by the arrow C. At the other end of the coolant flow field 90 in the direction indicated by the arrow B, the coolant flow field 90 is connected to the coolant discharge passage 26b through a connection groove 92b extending in the direction indicated by the arrow C.

As shown in FIG. 8, terminals (first output terminals) 94a, 94b and terminals (second output terminals) 96a, 96b are provided on the surface 20a of the second separator 20. The terminals 94a, 94b are connected to the connection terminals 66a, 66b of the second diffusion layer 16. The terminals 96a, 96b are connected to the connection terminals 68a, 68b of the second diffusion layer 16.

As shown in FIG. 1, the power generation circuit 104 includes a lead line 108a connected between the load 102 and the respective terminals 94a of the fuel cells 10a through 10n, and a lead line 108b connected between the load 102 and the switches 110a through 100n of the switching mechanism 106. The switches 110a through 110n are selectively connectable to the terminals 96a of the fuel cells 10a through 10n. Output voltages of the fuel cells 10a through 10n (power generation conditions) are detected, and the detected voltages are compared with a predetermined voltage for detecting abnormal conditions.

Next, operation of assembling the fuel cell 10a will be described.

Firstly, silicon films 46a, 46b are attached to both surfaces 28a, 28b of one solid polymer electrolyte membrane 28. The silicon films 46a, 46b have cutouts 48a, 48b corresponding to the shapes of the first through fourth membrane electrode assemblies 30 through 36. Other films such as thin polyimide films may be used instead of the silicon films 46a, 46b.

Then, cathode catalyst layers and anode catalyst layers are provided in the direction indicated by the arrow B on the silicon films 46a, 46b. The cathode catalyst layers and the anode electrolyte layers are provided alternately such that such that the anode catalyst layers on the silicon film 46a are positioned opposite to the cathode catalyst layers on the silicon film 46b, and the cathode catalyst layers on the silicon film 46a are positioned opposite to the anode catalyst layers on the silicon film 46b. Thus, the solid polymer electrolyte membrane 28 is interposed between the cathodes 38 and the anodes 40, and between the cathodes 44 and the anodes 42. A predetermined number of the first through fourth membrane electrode assemblies 30 through 36 are used for making up one MEA unit 12.

The first diffusion layer 14 and the second diffusion layer 16 are provided on both surfaces of the MEA unit 12, and the first and second separators 18, 20 are stacked on the first and second diffusion layers 14, 16. The first and second separators 18, 20 are fastened together by tightening means (not shown) for tightening the fuel cell 10a with a predetermined tightening force.

In the first embodiment, the cathodes 38, 44, and the anodes 40, 42 are provided on both surfaces 28a, 28b of the solid polymer electrolyte membrane 28, by coating, for example. The first membrane electrode assemblies 30, the second membrane electrode assemblies 32, the third membrane electrode assemblies 34, and the fourth membrane electrode assemblies 36 are provided on a same plane to form the MEA unit 12. The MEA unit 12 is interposed between the first and second diffusion layers 14, 16. In this manner, the first through fourth membrane electrode assemblies are electrically connected in series by the metal diffusion layers 50, 58 and the resin insulators 54, 56, 62, and 64 (see FIG. 4).

Specifically, as shown in FIG. 3, the cathode 44 of the fourth membrane electrode assembly 36 at an end in the direction indicated by an arrow C1 and the anode 42 of the third membrane electrode assembly 32 positioned adjacently in the direction indicated by an arrow C2 are electrically connected with each other by the metal diffusion layer 50. The anode 42 of the fourth membrane electrode assembly 36 and the cathode 44 of the third membrane electrode assembly 34 are electrically insulated from each other by the resin insulator 62.

The cathode 44 of the third membrane electrode assembly 34 and the anode 42 of the fourth membrane electrode assembly 36 positioned adjacently in the direction indicated by the arrow C2 are electrically connected with each other by the metal diffusion layer 58. The anode 42 of the third membrane electrode assembly 34 and the cathode 44 of the fourth membrane electrode assembly 36 are electrically insulated from each other by the resin insulator 54.

Likewise, the cathode 44 of the fourth membrane electrode assembly 36 and the anode 42 of the third membrane electrode assembly 34 positioned adjacently in the direction indicated by the arrow C2 are electrically connected with each other by the metal diffusion layer 50. The anode 42 of the fourth membrane electrode assembly 36 and the cathode 44 of the third membrane electrode assembly 34 are electrically insulated from each other by the resin insulator 62.

Thus, the first through fourth membrane electrode assemblies 30 through 36 are electrically connected in series in the MEA unit 12 as indicated by the arrows in FIG. 4. A predetermined level of voltage is generated between the first membrane electrode assembly 30a at the front end and the second membrane electrode assembly 32a at the rear end.

The metal diffusion layers 50, 58 function to connect the electrodes. Therefore, conventional Z-like connection plates are not required. The number of components of the fuel cell is small. The structure is economical, in particular when a large number of power generation units are provided in the fuel cell system. Further, the fuel cells 10a through 10n have a simple structure, and are small.

Moreover, for example, the coolant flow field 90 is formed on the surface 20b of the second separator 20 which is made of electrically insulating material. The coolant supply passage 26a and the coolant discharge passage 26b are also defined by insulating material. The coolant circuit including the coolant flow field 90 is electrically insulated effectively. Thus, leakages of the electricity to the liquid or the earth are reliably prevented.

Consequently, special coolant for the fuel cell or dedicated devices for preventing the liquid leakage such as an ion exchanger are not required. The cooling system is simple, and produced or operated at a low cost. The periodical maintenance operations are not required.

Next, operation of the fuel cell unit 100 will be described.

In operation, referring to FIG. 2, an oxygen-containing gas such as air is supplied to the oxygen-containing gas supply passage 22a, a fuel gas such as a hydrogen-containing gas is supplied to the fuel gas supply passage 24a, and a coolant such as pure water, an ethylene glycol or an oil is supplied to the coolant supply passage 26a.

As shown in FIG. 7, the oxygen-containing gas flows from the oxygen-containing gas supply passage 22a into the oxygen-containing gas flow fields 70 of the first and fourth membrane electrode assemblies 30, 36, through the connection groove 74a on the surface 18a of the first separator 18. The oxygen-containing gas flows along the cathodes 38, 44 of the first and fourth membrane electrode assemblies 30, 36 in the direction indicated by the arrow B to induce a chemical reaction at the cathodes 38, 44. The oxygen-containing gas is discharged into the oxygen-containing gas discharge passage 22b through the connection groove 74b.

Further, as shown in FIG. 8, the oxygen-containing gas is supplied to the oxygen-containing gas flow fields 80 through the connection groove 84a formed on the surface 20a of the second separator 20. The oxygen-containing gas flows through the oxygen-containing gas flow fields 80 in the direction indicated by the arrow B along the cathodes 38, 44 of the second and third membrane electrode assemblies 32, 34 for inducing a chemical reaction at the cathodes 38, 44.

The oxygen-containing gas is discharged into the oxygen-containing gas discharge passage 22b through the connection groove 84b.

As shown in FIG. 2, the fuel gas is supplied to the connection groove 78a formed on the surface 18b of the first separator 18. The fuel gas flows through the through-holes 76a connected to the connection groove 78a, and flows into the fuel gas flow fields 72 (see FIG. 7). The fuel gas flows through the fuel gas flow fields 72 in the direction indicated by the arrow B along the anodes 40, 42 of the second and third membrane electrode assemblies 32, 34 for inducing a chemical reaction at the anodes 40, 42. The fuel gas flows into the connection groove 78b on the surface 18b of the first separator 18 through the through-holes 76b. Then, the fuel gas is discharged into the fuel gas discharge passage 24b.

Further, as shown in FIG. 9, the fuel gas is supplied to the connection groove 88a on the surface 20b of the second separator 20. The fuel gas flows through the through-holes 86a connected to the connection groove 88a, and flows into the fuel gas flow fields 82 on the surface 20a of the second separator 20. As shown in FIG. 8, the fuel gas flows through the fuel gas flow fields 82 in the direction indicated by the arrow B along the anodes 40, 42 of the first and fourth membrane electrode assemblies 30, 36 for inducing a chemical reaction at the anodes 40, 42. The fuel gas flows into the connection groove 88b on the surface 20b through the through-holes 86b. Then, the fuel gas is discharged into the fuel gas discharge passage 24b.

Thus, in the first through fourth membrane electrode assemblies 30 through 36, the oxygen-containing gas supplied to the cathodes 38, 44, and the fuel gas supplied to the anodes 40, 42 are consumed in the electrochemical reactions at catalyst layers of the cathodes 38, 44 and the anodes 40, 42 for generating electricity. All of the power generation units, i.e., the first through membrane electrode assemblies 30 through 36 are electrically connected in series between the terminals 94a and 96a for outputting a desired level of voltage. The fuel cells 10b through 10n are operated as with the fuel cell 10a for power generation. The fuel cells 10a through 10n are connected in parallel. The electrical current outputted from the stack of the fuel cells 10a through 10d have a current value corresponding to the total of the current values of electrical currents outputted from the respective fuel cells 10a through 10 d.

In the first embodiment, the fuel cells 10a through 10n are electrically connected in parallel to the power generation circuit 104. The fuel cells 10a through 10n are selectively connected to the power generation circuit 104 by the switches 110a through 110n of the switching mechanism 106. The desired level of voltage is generated in each of the fuel cells 10a through 10n. Even if one of the fuel cells 10a through 10n, for example, the fuel cell 10a failure, the desired level of voltage can be maintained by the remaining fuel cells 10b through 10n.

The fuel cell 10a in the abnormal condition is disconnected from the power generation circuit 104 by the switch 110a. Thus, it is possible to prevent the reverse voltage from being applied to the fuel cell 10a, and continue the power generation by the remaining fuel cells 10b through 10b of the fuel cell unit 100. The fuel cell 10a which has stopped the power generation is not damaged, and the efficient power generation can be carried out reliably.

Figure 10:
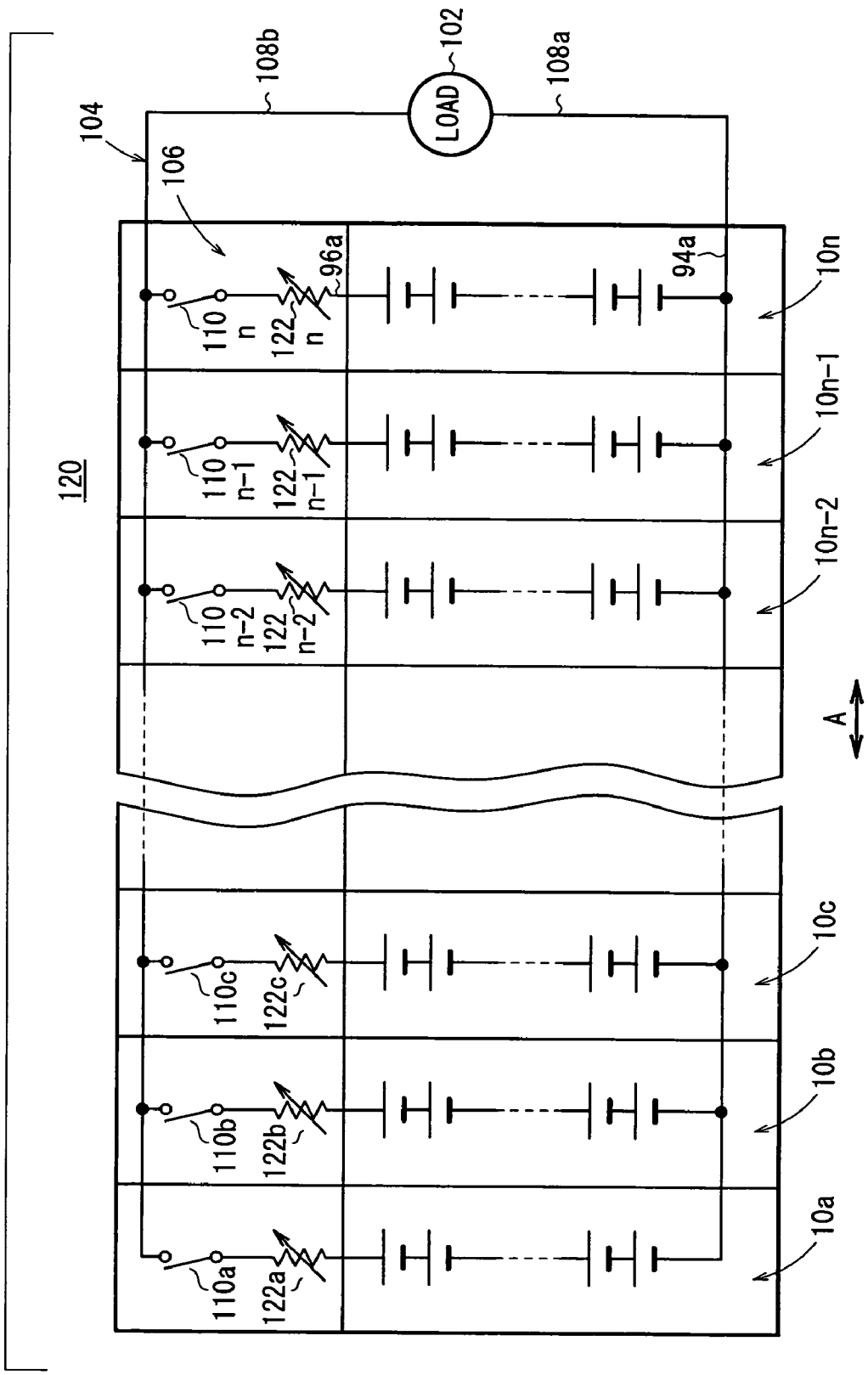
FIG. 10 is a diagram schematically showing a fuel cell unit according to a second embodiment of the present invention.

FIG. 10 is a diagram schematically showing a fuel cell unit 120 according to a second embodiment of the present invention. The constituent elements that are identical to those of the fuel cell unit 100 according to the first embodiment are labeled with the same reference numeral, and description thereof will be omitted. Likewise, in third and fourth embodiments as described later, the constituent elements that are identical to those of the fuel cell unit 100 according to the first embodiment are labeled with the same reference numeral, and description thereof will be omitted.

In the fuel cell unit 120, variable resistors 122a through 122n are electrically connected in series to fuel cells 10a through 10n, respectively, for regulating the voltage level in each of the fuel cells 10a through 10n.

In the second embodiment, the variable resistors 122a through 122n are operated for regulating the voltage in each of the fuel cells 10a through 10 n. Thus, the fuel cell unit 120 can carry out power generation efficiently without the voltage difference among the fuel cells 10a through 10n. If any of the fuel cells 10a through 10n, for example, fuel cell 10a has a failure, and the voltage generated by the fuel cell 10a does not fall within the variable voltage range of the variable resistor 122a, the fuel cell 10a in the abnormal condition is disconnected from the power generation circuit 104.

Figure 11:
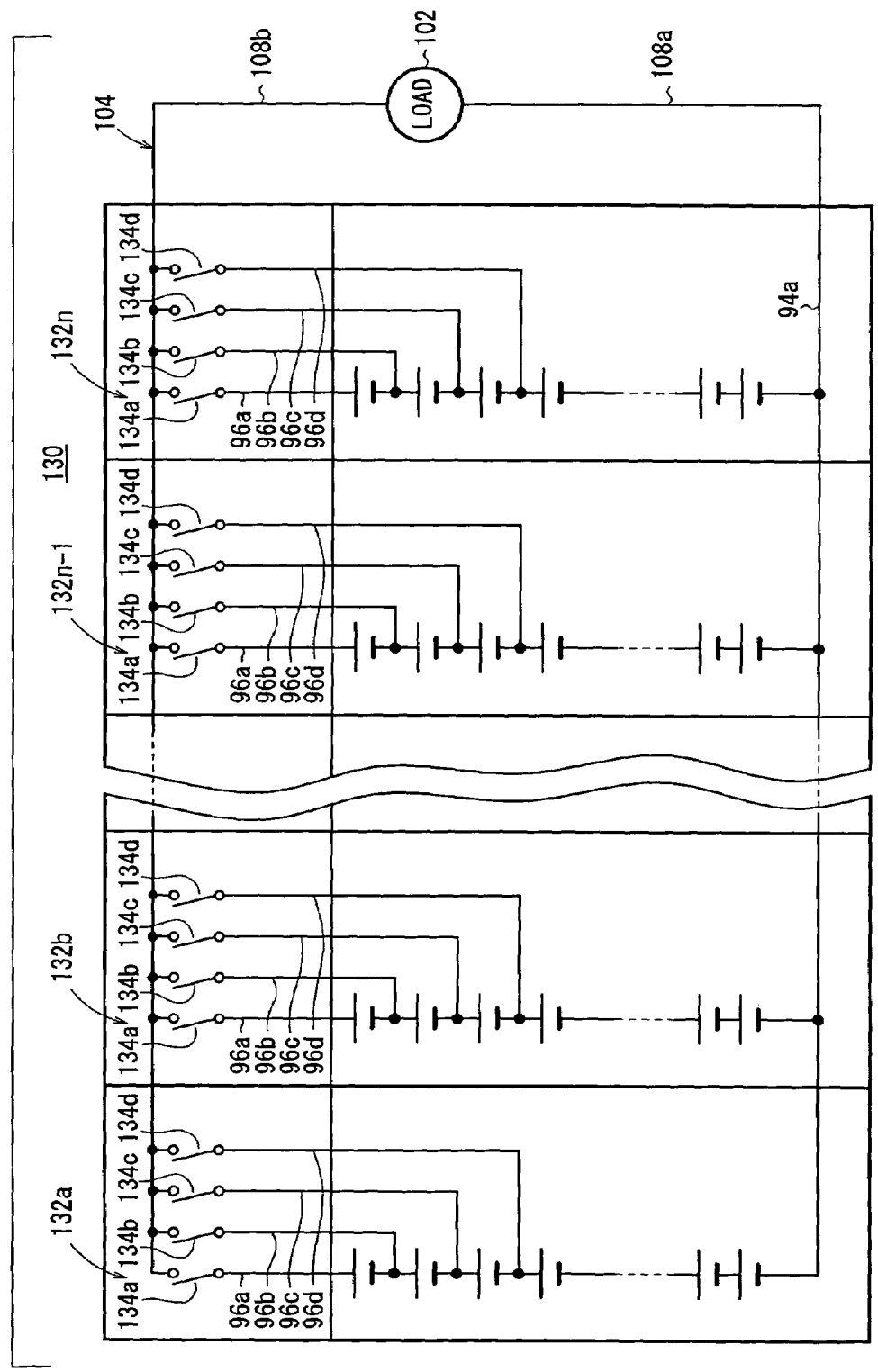
FIG. 11 is a diagram schematically showing a fuel cell unit according to a third embodiment of the present invention.

FIG. 11 is a diagram schematically showing a fuel cell unit 130 according to the third embodiment of the present invention.

The fuel cell unit 130 includes the fuel cells 10a through 10n each having terminals 96a, 96b, 96c, and 96d. The terminals 96a, 96b, 96c, and 96d are electrically connected in series to different numbers of power generation units (first through fourth membrane electrode assemblies 30 through 36), respectively. Switching mechanisms 132a through 132n are used for selectively connecting the terminals 96a through 96d to the power generation circuit 104. Specifically, switches 134a through 134d of the switching mechanism 132a through 132n selectively connect the terminals 96a through 96d to, or disconnect the terminals 96a through 96d from the power generation circuit 104.

In the third embodiment, the switches 134a through 134d are used in each of the switching mechanism 132a through 132n for selectively connecting arbitrary one of the terminals 96a through 96d to the power generation circuit 104. Therefore, the level of the voltage outputted from the power generation unit 130 can be changed flexibly depending to the power generation condition. Thus, the voltage differences among the fuel cells 10a through 10n are suitably regulated, and the efficient power generation can be carried out.

Figure 12:
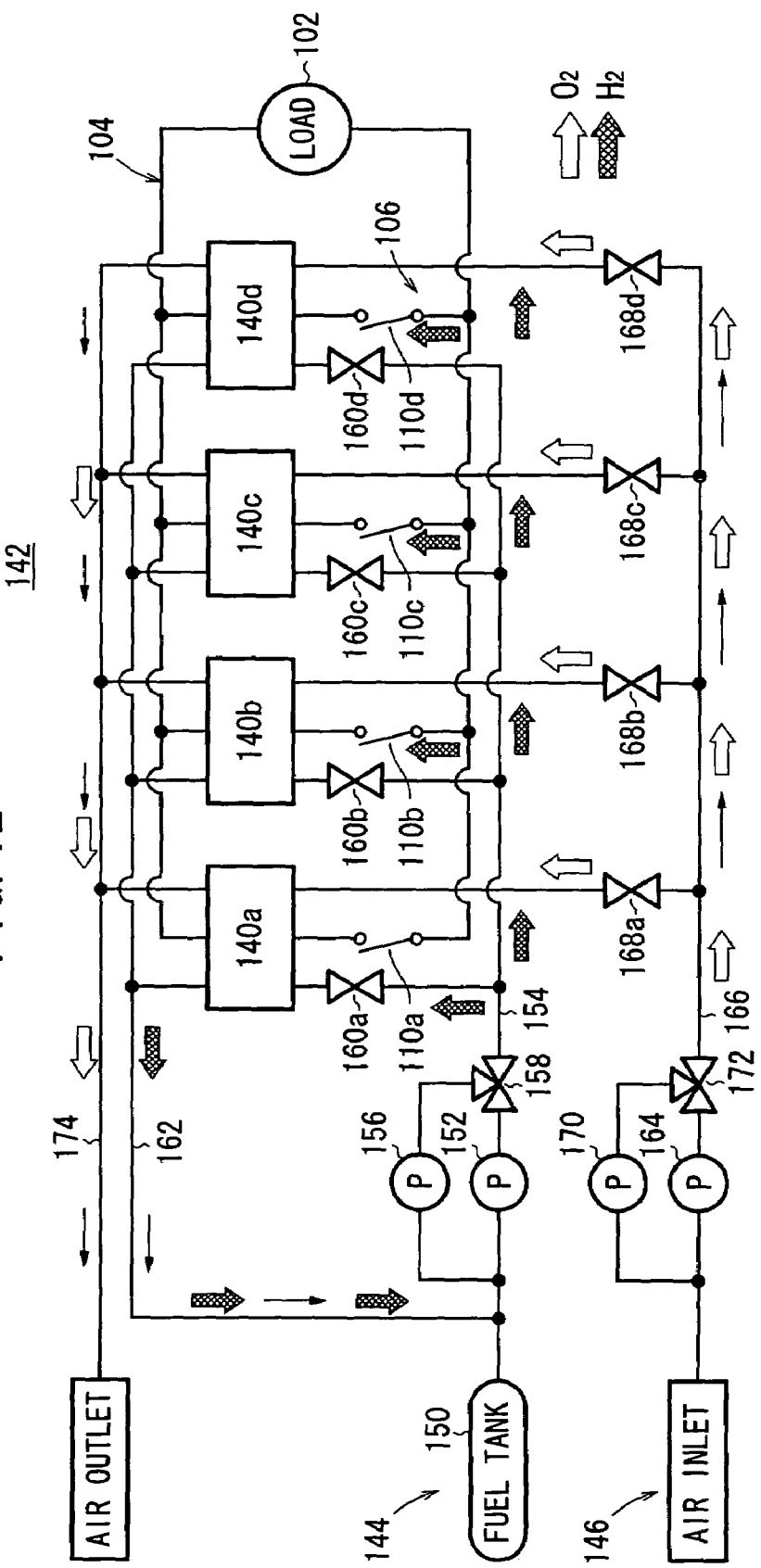
FIG. 12 is a view schematically showing a reactant gas circuit of a fuel cell system including fuel cell units according to a fourth embodiment of the present invention.
Figure 13:
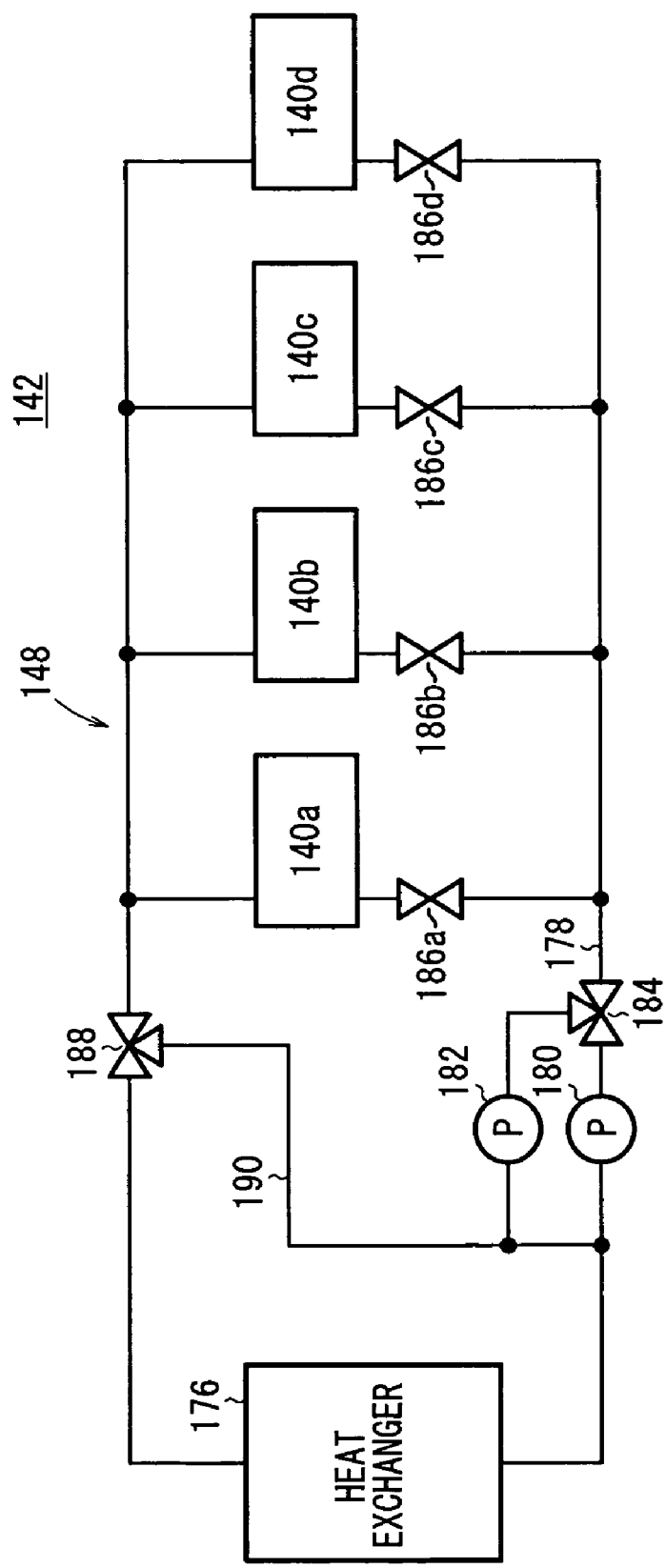
FIG. 13 is a diagram schematically showing a coolant circuit of the fuel cell system.

FIG. 12 is a diagram schematically showing a reactant gas circuit of a fuel cell system 142 including fuel cell units 140a, 140b, 140c, and 104d according to the fourth embodiment of the present invention. FIG. 13 is a diagram schematically showing a coolant circuit of the fuel cell system 142.

As shown in FIG. 12, the fuel cell system 142 includes a power generation circuit 104 for connecting the fuel cell units 140a through 140d in parallel to a load 102. Further, the fuel cells system 142 includes a switching mechanism 106 for selectively connecting the fuel cell units 140a through 140d to the power generation circuit 104. Each of the fuel cell units 140a through 140d is formed by stacking the fuel cells 10a through 10n according to the first embodiment of the present invention. The switching mechanism 106 includes switches 10a through 10d corresponding to the fuel cell units 140a through 140d.

Further, the fuel cell system 142 includes a fuel gas supplying mechanism 144 for supplying the fuel gas to the fuel gas units 140a through 140d in parallel, an oxygen-containing gas supplying mechanism 146 for supplying the oxygen-containing gas to the fuel gas units 140a through 140d in parallel, and a coolant supplying mechanism 148 for supplying the coolant to the fuel cell units 140a through 140d in parallel (see FIGS. 12 and 13).

As shown in FIG. 12, the fuel gas supplying mechanism 144 includes a supply pipe 154 connected to a fuel tank 150 through a first fuel pump 152. The supply pipe 154 is connectable to a second fuel pump 156 by a switching valve 158 for supplying small electrical energy to the load 102. The first fuel pump 152 and the second fuel pump 156 are provided in parallel with each other.

The supply pipe 154 is branched into four passages corresponding to the fuel cell units 140a through 140d. The four passages are closed or opened by valves 160a through 160d for stopping or starting the supply of the fuel gas.

Further, the fuel cell units 140a through 140d are connected to a discharge pipe 162 for discharging the fuel gas. The discharge pipe 162 is connected to the supply pipe 154 to form a circulation passage.

The oxygen-containing gas supplying mechanism 146 includes a supply pipe 166 connected to a first air pump 164. The supply pipe 166 is branched into four passages corresponding to the fuel cell units 140a through 140d. The four passages are closed or opened by valves 168a through 168d for selectively stopping or starting the supply of the oxygen-containing gas to the fuel cell units 140a through 140d. The supply pipe 166 is connectable to a second air pump 170 by a switching valve 172 for supplying small electrical energy to the load 102. The first air pump 164 and the second air pump 170 are provided in parallel with each other. The oxygen-containing gas is discharged from the fuel cell units 140a through 140d to the outside through a discharge pipe 174.

As shown in FIG. 13, the coolant supplying mechanism 148 includes a circulation pipe 178. A heat exchanger is disposed in the circulation pipe 178. The circulation pipe 178 is selectively connectable to a first coolant pump 180 and a second coolant pump 182 by a switching valve 184. The second coolant pump 182 is connected to the circulation pipe 178 when small electrical energy is supplied to the load 102.

The circulation pipe 178 is branched into four passages corresponding to the fuel cell units 140a through 140d. The coolant is supplied to the fuel cell units 140a through 140d through flow amount control valves (flow regulators) 186a through 186d. The coolant discharged from the fuel cell units 140a through 140d may flow into a bypass pipe 190 such that the coolant flows directly into the first and second coolant pumps 180, 182 bypassing the heat exchanger 176. The bypass pipe 190 is connectable to the fuel cell units 140a through 140d by a switching valve 188.

In the fuel cell system 142, the first fuel pump 152, the first air pump 164, and the first coolant pump 180 are selectively operated depending on a predetermined level of electrical energy supplied to the load 102. In the fuel gas supplying mechanism 144, the fuel gas in the fuel tank 150 is supplied to the supply pipe 154, and the fuel gas flows through the branched passages, and the fuel gas is supplied to the fuel cell units 140a through 140d in parallel. The fuel gas consumed in the fuel cell units 140a through 140d is discharged into the discharge pipe 162, and circulated again into the supply pipe 154.

In the oxygen-containing gas supplying mechanism 146, the first air pump 164 is operated to supply the oxygen-containing gas through the supply pipe 166 to the fuel gas units 140a through 140d in parallel. After the oxygen-containing gas is consumed in the fuel cell units 140a through 140d, the oxygen-containing gas is discharged to the outside through the discharge pipe 174. In this manner, the fuel gas and the oxygen-containing gas are supplied to each of the fuel cell units 104a through 104d for power generation as with the first embodiment, and the generated electrical energy is supplied to the load 102.

In the coolant supplying mechanism 148, the first coolant pump 180 is operated to circulate the coolant through the circulation pipe 178. The coolant is supplied to the fuel cell units 140a through 140d in parallel for cooling the fuel cell units 140a through 140d. Then, the coolant is supplied to the bypass pipe 190. The coolant flows through the heat exchanger 176 as necessary for decreasing the temperature of the coolant, and the coolant is used again for cooling the fuel cell units 140a through 140d.

In the fourth embodiment, power generation conditions in the fuel cell units 140a through 140d are detected based on the levels of the voltage generated by the fuel cell units 140*a* through 140*d*, for example. If any of the fuel cell units 140*a* generates the voltage of an excessively high or low level, i.e., if an abnormal power generation condition occurs, the switching mechanism 106 is operated. For example, if the fuel cell unit 140*b* is in an abnormal power generation condition, the fuel cell 140*b* is disconnected from the power generation circuit 104 by the switch 110*b*.

It is possible to prevent the reverse voltage from being applied to the abnormal fuel cell unit 140*b*, and to continue the power generation using the remaining fuel cells 140*a*, 140*c*, and 140*d*. Thus, the power generation is carried out efficiently. In this case, the valves 160*b*, 168*b* of the fuel gas supplying mechanism 144 and the oxygen-containing gas supplying mechanism 146 are closed for stopping the supply of the fuel gas and the oxygen-containing gas to the fuel cell unit 140*b* to stop the power generation of the fuel cell unit 140*b* only.

Figure 14:
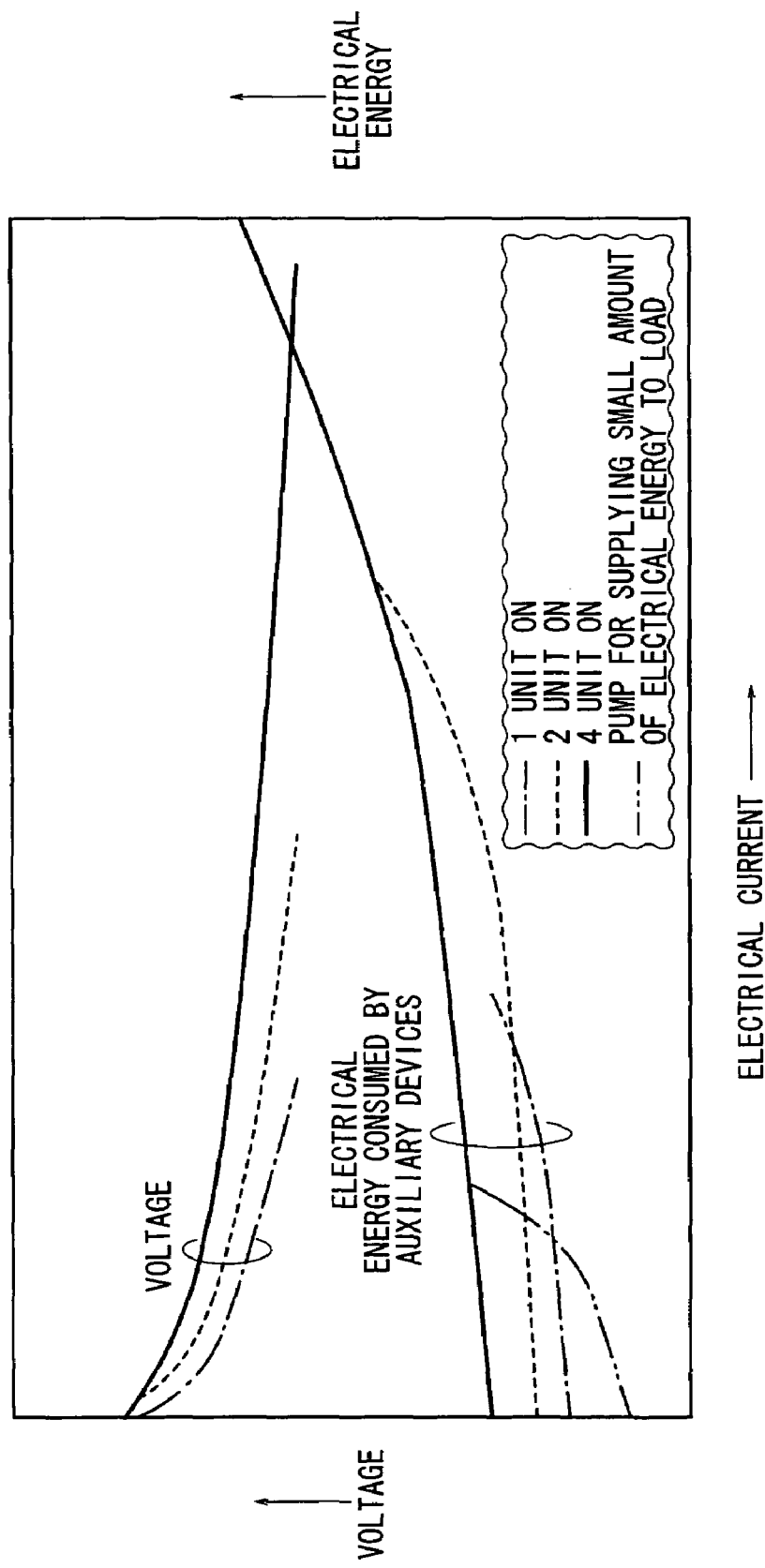
FIG. 14 is a graph showing relationship between the number of fuel cell units and the amount of electrical energy consumed by auxiliary devices.
Figure 15:
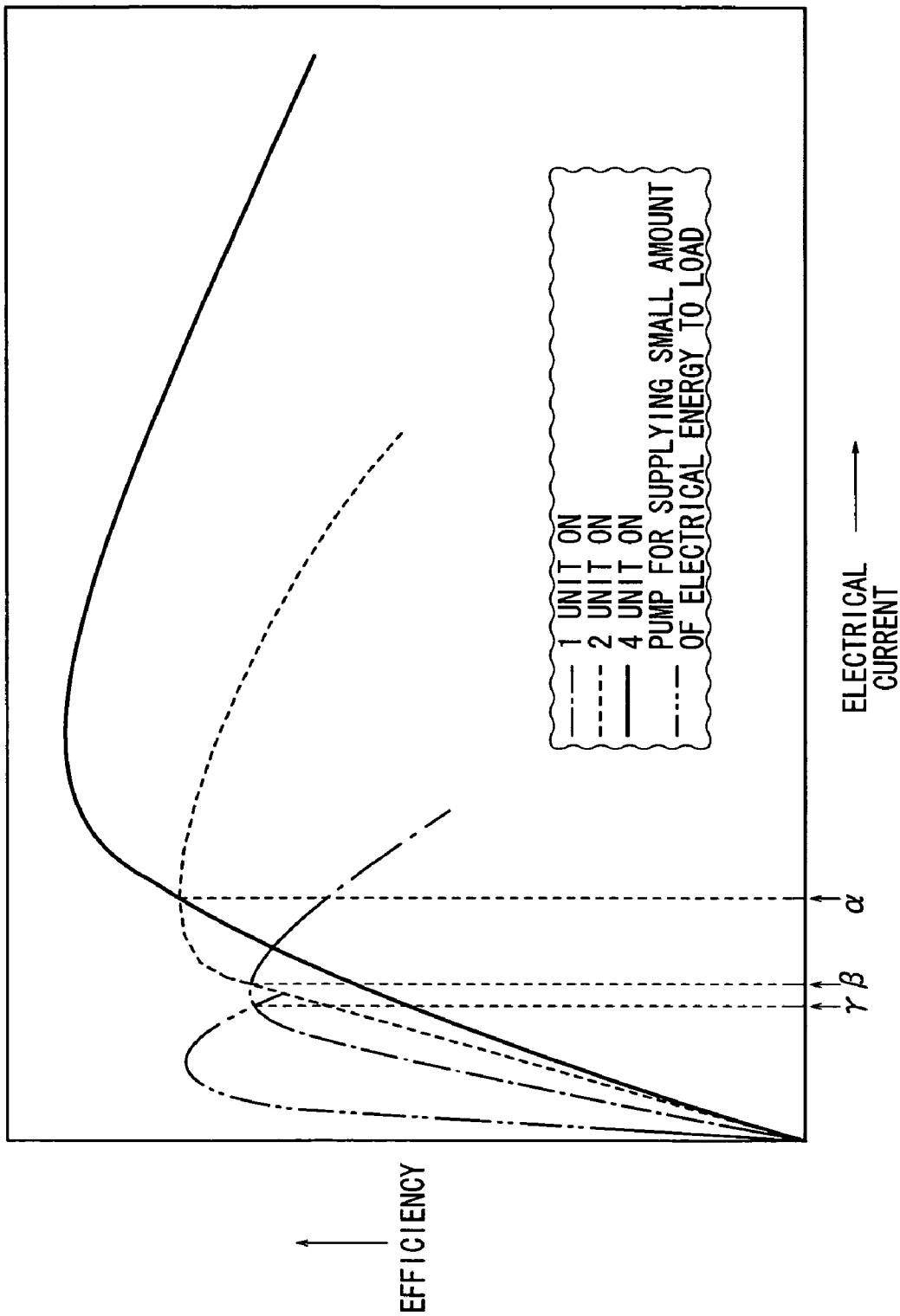
FIG. 15 is a graph showing efficiency of power generation depending on the number fuel cell units.

Further, in supplying small electrical energy to the load 102, one, two, or three of the fuel cell units 140*a* through 140*d* are stopped selectively. FIG. 14 is a graph showing relationship between the number of fuel cell units and the amount of electrical energy consumed by the auxiliary devices. FIG. 15 is a graph showing efficiency of power generation depending on the number fuel cell units. These figures show three cases in which all of the fuel cell units 140*a* through 140*d* are operated for power generation (4 UNIT ON), only two fuel cell units 140*a*, 140*b* are operated for power generation (2 UNIT ON), and only one fuel cell 140*a* is operated for power generation (1 UNIT ON).

When only the two fuel cell units 140*a*, 140*b* are operated, the supply of the fuel gas and the supply of the oxygen-containing gas to the fuel cell units 140*c*, 140*d* are stopped, and the amount of coolant supplied to the fuel gas units 140*c*, 140*d* is reduced. When only one fuel unit 140*a* is operated, the supply of the fuel gas and the supply of the oxygen-containing gas to the fuel cell units 140*b* through 104*d* are stopped, and the amount of coolant supplied to the fuel gas units 140*b* through 140*d* is reduced.

As shown in FIG. 15, when the electrical current (electrical energy supplied to the load) is α or less, the power generation is performed in the 2 UNIT ON mode. When the electric current (electrical energy supplied to the load) is β or less, the power generation is performed in the 1 UNIT ON mode. When electrical current (electrical energy supplied to the load) is γ or less, the power generation is performed in the 1 UNIT ON mode, and the switching valves 158, 172 are operated to use the second fuel pump 156 and the second air pump 175 for supplying small amounts of the fuel gas and the oxygen-containing gas corresponding to the small electrical energy supplied to the load 102.

Consequently, as shown in FIGS. 14 and 15, when the power generation is performed for supplying small energy to the load 102, for example, when the generated electrical current is γ which is smaller than β, the power generation efficiency is improved. When the power generation is performed at a low level mode for supplying small electrical energy to the load 102, a desirable number of fuel cell units are selected for performing the optimized power generation corresponding to the electrical current to be outputted to the load 102. Thus, the efficient power generation is carried out reliably.

The power generation of at least one of the fuel cell units 140*a* through 140*d* is stopped in the following manner. For example, the power generation of the fuel cell units 140*a* through 14*d* is stopped one by one successively. Specifically, the fuel cell unit 140*a* is stopped for a predetermined period of time, and then, the fuel cell unit 140*b* is stopped for a predetermined period of time, and the fuel cell unit 140*b* is stopped for a predetermined period of time, and then, the fuel cell unit 140*c* is stopped.

Thus, the fuel cell units 140*a* through 140*d* are not dried excessively, or cooled excessively. Since the fuel cell units 140*a* through 140*d* stop power generation periodically, these fuel cell units 140*a* through 140*d* are purged effectively.

When the fuel cell unit 140*a* is not operated for power generation, the flow amount control valve 186*a* is operated to reduce the amount of the coolant supplied to the fuel cell unit 140*a*. The amount of coolant supplied to the fuel cell unit 140*a* is smaller than the amount of coolant supplied to the fuel cell units 140*b* through 140*d* which are operating for power generation. Thus, when the fuel cell unit 140*a* is stopped, the temperature of the fuel cell unit 140*d* does not decrease excessively. The temperature of the fuel cell unit 140*a* is maintained at a desired level. The work load on the first coolant pump 180 or the second coolant pump 182 is reduced to improve the efficiency.

When small electrical energy is supplied to the load 102, the second air pump 172 and the second coolant pump 182 are operated for power generation. In this manner, the power generation is performed under the optimized condition.

Figure 16:
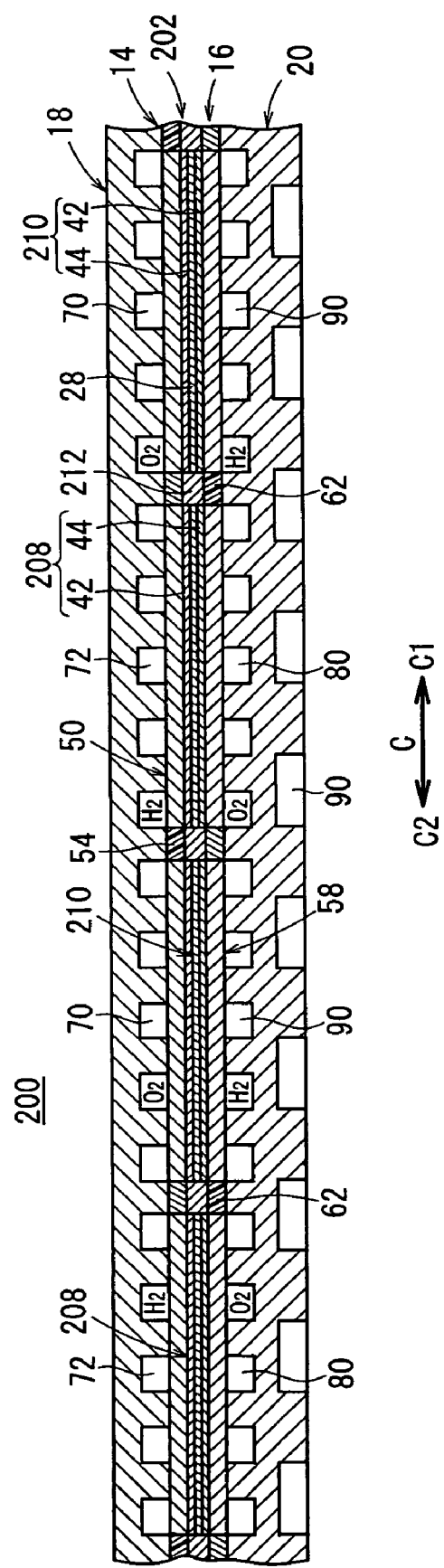
FIG. 16 is a cross sectional view showing a part of a fuel cell according to a fifth embodiment of the present invention.
Figure 17:
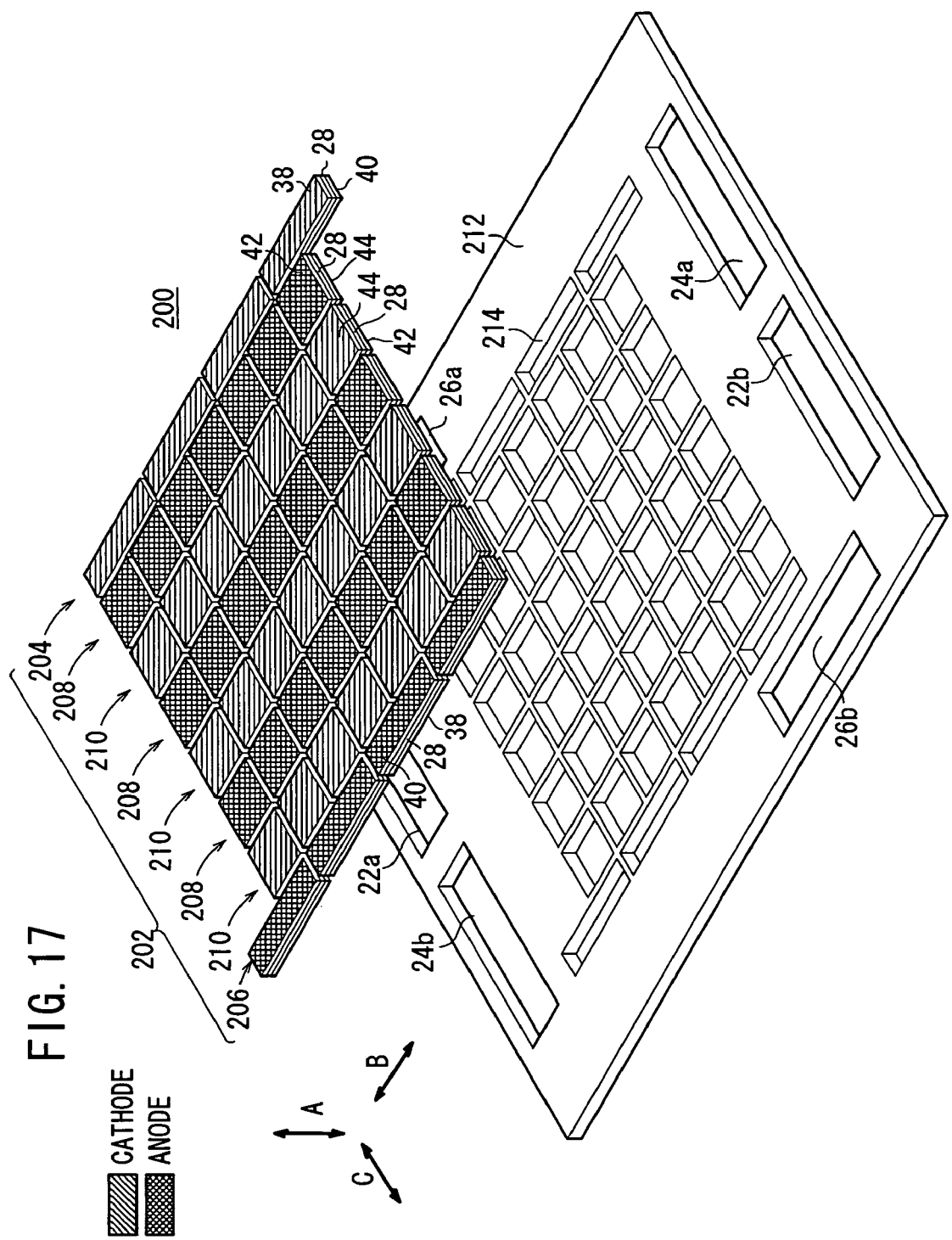
FIG. 17 is an exploded perspective view showing MEA units of the fuel cell.
Figure 18:
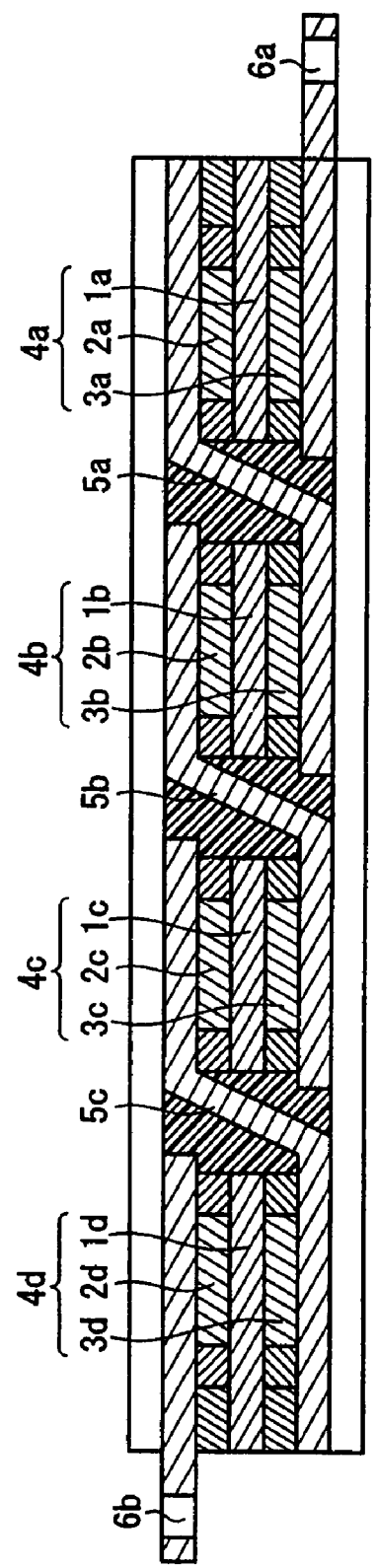
FIG. 18 is a cross sectional view showing main components of a conventional flat fuel cell.

FIG. 16 is a cross sectional view showing a part of a fuel cell 200 according to a fifth embodiment of the present invention. The constituent elements that are identical to those of the fuel cell 10*a* according to the first embodiment are labeled with the same reference numeral, and description thereof will be omitted.

The fuel cell 200 includes a MEA unit 202 interposed between first and second diffusion layers 14, 16. The first and second diffusion layers 14, 16 are sandwiched between first and second separators 18, 20. The MEA unit 202 includes a predetermine number of first membrane electrode assemblies 204, a predetermined number of second membrane electrode assemblies 206, and a predetermined number of third membrane electrode assemblies 208, and a predetermined number of fourth membrane electrode assemblies 210. The third and fourth membrane electrode assemblies 208, 210 are arranged alternately between the first and second membrane electrode assemblies 204, 206 in the direction indicated by the arrow C.

The first through fourth membrane electrode assemblies 204 through 210 are provided separately, and have multiple layers on a silicon film 212 formed by a spray or a coater, for example. Specifically, the silicon film 212 has cutouts 214 corresponding to the shapes of the electrodes. Firstly, the anodes 40 and cathodes 38 of the first and second membrane electrode assemblies 204, 206, and the cathodes 44 and the anodes 42 of the third and fourth membrane electrode assemblies 208, 210 are formed on the silicon film 212 by coating, for example.

Then, a solid polymer electrolyte membrane 28 is formed by coating through the cutouts 214 of the silicon film 212. Thereafter, the cathodes 38 and the anodes 40 of the first and second membrane electrode assemblies 204, 206, and the anodes 42 and the cathodes 44 of the third and fourth membrane electrode assemblies 208, 210 are formed by coating. Thus, the first through fourth membrane electrode assemblies 204 through 210 are formed on the silicon film 212 separately.

In the fifth embodiment, the catalyst layers and the ion exchange membrane of the MEA unit 202 are formed by multilayer coating using a spray or a coater. Thus, the MEA unit 202 can be produced easily.

According to the present invention, the desired level of voltage can be obtained in each of the fuel cells or in each of fuel cell units. Thus, if one or more fuel cell or fuel cell unit is in an abnormal power generation condition, the desired level of voltage can be maintained by the remaining fuel cells or fuel cell units.

If one or more fuel cell or fuel cell unit is in an abnormal power generation condition, the abnormal fuel cell or the fuel cell unit is disconnected from the power generation circuit. Thus, the reverse voltage is not applied to the abnormal fuel cell or the fuel cell unit. Since the remaining fuel cells of the fuel cell unit or the remaining fuel cell units can continue the power generation without the abnormal fuel cell or the fuel cell unit, the power generation efficiency can be carried out efficiently.

According to the present invention, the adjacent power generation units are connected with each other. The metal diffusion layer of one of the adjacent power generation units is connected to the metal diffusion layer of the other of the adjacent power generation units. Pairs of the adjacent power generation units are connected for connecting the power generation units in series with each other. Thus, the conventional Z-like connection plates are not required.

The number of components of the fuel cell is small. In particular, when a large number of power generation units are provided in the fuel cell, the fuel cell has a reliable sealing structure, and the fuel cell is economical. The overall fuel cell system is simple and small.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell unit comprising:
    a plurality of fuel cells, said fuel cells each comprising a plurality of power generation units arranged on a same plane, and electrically connected in series, said power generation units each including an anode, a cathode, and an electrolyte interposed between said anode and said cathode, wherein the plurality of power generation units are formed from a row of a plurality of anodes disposed adjacent to a row of a plurality of cathodes;
    a plurality of intermaterial sections provided around each anode and each cathode;
    a power generation circuit for connecting said fuel cells to a load;
    a switching mechanism for selectively connecting said fuel cells in parallel to said power generation circuit;
    first and second metal diffusion layers provided on both surfaces of said power generation units,
    wherein sections of the first metal diffusion layer corresponding to said intermaterial sections provided around each anode and each cathode:
        electrically couple a first anode to a first cathode, wherein the first anode is adjacent to the first cathode; and
        electrically insulate a second anode from a second cathode, wherein the second anode is adjacent to the second cathode;
    wherein sections of the second metal diffusion layer corresponding to said intermaterial sections provided around each anode and each cathode:
        electrically insulate a third anode from a third cathode; and
        electrically couple a fourth anode to a fourth cathode; and
    wherein:
        a first of the power generation units comprises the first anode and the third cathode;
        a second of the power generation units comprises the first cathode and the third anode;
        a third of the power generation units comprises the second anode and the fourth cathode;
        a fourth of the power generation units comprises the second cathode and the fourth anode.

2. A fuel cell unit according to claim 1, wherein each of said fuel cells is connected to a variable resistor.

3. A fuel cell unit according to claim 1, wherein said fuel cell further including:
    at least one first output terminal connected to one of said anode and said cathode; and
    a plurality of second output terminals connected to the other of said anode and said cathode for connecting different numbers of said power generation units in series between said first output terminal and said second output terminals, respectively, wherein
    said switching mechanism selectively connects one of said second output terminals to said first output terminal.

4. A fuel cell system comprising;
    a plurality of fuel cell units each formed by stacking a plurality of fuel cells together, said fuel cells each comprising a plurality of power generation units arranged on a same plane, and electrically connected in series, said power generation units each including an anode, a cathode, and an electrolyte interposed between said anode and said cathode, wherein the plurality of power generation units are formed from a row of a plurality of anodes disposed adjacent to a row of a plurality of cathodes;
    a plurality of intermaterial sections provided around each anode and each cathode;
    a power generation circuit for connecting said fuel cell units in parallel to a load;
    a switching mechanism for selectively connecting said fuel cell units to said power generation circuit;
    first and second metal diffusion layers provided on both surfaces of said power generation units,
    wherein sections of the first metal diffusion layer corresponding to said intermaterial sections provided around each anode and each cathode:
        electrically couple a first anode to a first cathode, wherein the first anode is adjacent to the first cathode; and
        electrically insulate a second anode from a second cathode, wherein the second a node is adjacent to the second cathode;
    wherein sections of the second metal diffusion layer corresponding to said intermaterial sections provided around each anode and each cathode:
        electrically insulate a third anode from a third cathode; and
        electrically couple a fourth anode to a fourth cathode; and
    wherein:
        a first of the power generation units comprises the first anode and the third cathode;
        a second of the power generation units comprises the first cathode and the third cathode;
        a third of the power generation units comprises the second anode and the fourth cathode;
        a fourth of the power generation units comprises the second cathode and the fourth anode.

5. A fuel cell system according to claim 4, further comprising:
- a fuel gas supplying mechanism for supplying a fuel gas to said fuel cell units in parallel; and
- an oxygen-containing gas supplying mechanism for supplying an oxygen-containing gas to said fuel cell units in parallel,
- wherein each of said fuel gas supplying mechanism and said oxygen-containing gas supplying mechanism have a valve for each of fuel cell units for stopping supply of said fuel gas and said oxygen-containing gas.

6. A fuel cell system according to claim 5, wherein first and second pumps are connected in parallel to said fuel gas supplying mechanism and said oxygen-containing gas supplying mechanism, and said first pumps supply predetermined amounts of said fuel gas and said oxygen-containing gas corresponding to a predetermined electrical energy supplied to said load and said second pumps supply small amounts of said oxygen-containing gas and said fuel gas corresponding to a small amount of electrical energy supplied to said load.

7. A fuel cell system according to claim 4, further comprising a coolant supplying mechanism for supplying a coolant to said fuel cell units in parallel, wherein said coolant supplying mechanism has flow regulators for regulating a flow amount of said coolant supplied to each of said fuel cell units.

8. A fuel cell system according to claim 7, wherein a first pump and a second pump are connected in parallel to said coolant supplying mechanism, and said first pump supplies a predetermined amount of said coolant corresponding to a predetermined electrical energy supplied to said load and said second pump supplies a small amount of said coolant corresponding to a small amount of electrical energy supplied to said load.

9. A fuel cell unit according to claim 1, said fuel cell further including:
- a resin insulator provided in said metal diffusion layer, between predetermined power generation units.

10. A fuel cell system according to claim 4, said fuel cell further including:
- a resin insulator provided in said metal diffusion layer, between predetermined power generation units.

* * * * *